United States Patent
Saeki et al.

(10) Patent No.: US 9,696,464 B2
(45) Date of Patent: Jul. 4, 2017

(54) MOLD HAVING AN UNEVEN SURFACE STRUCTURE, OPTICAL ARTICLE, MANUFACTURING METHOD THEREFOR, TRANSPARENT SUBSTRATE FOR SURFACE LIGHT EMITTER AND SURFACE LIGHT EMITTER

(75) Inventors: Yumiko Saeki, Yokohama (JP); Toshiaki Hattori, Yokohama (JP); Toru Tokimitsu, Yokohama (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 14/125,332

(22) PCT Filed: Jun. 15, 2012

(86) PCT No.: PCT/JP2012/065430
§ 371 (c)(1),
(2), (4) Date: Dec. 11, 2013

(87) PCT Pub. No.: WO2012/173258
PCT Pub. Date: Dec. 20, 2012

(65) Prior Publication Data
US 2014/0117397 A1    May 1, 2014

(30) Foreign Application Priority Data

Jun. 17, 2011   (JP) .................................. 2011-135214
Mar. 21, 2012   (JP) .................................. 2012-063709

(51) Int. Cl.
*H01L 21/00*   (2006.01)
*G02B 5/02*   (2006.01)
(Continued)

(52) U.S. Cl.
CPC .......... *G02B 5/0268* (2013.01); *B29C 33/424* (2013.01); *B29C 37/0053* (2013.01);
(Continued)

(58) Field of Classification Search
CPC ............ B29C 53/04; B29C 2035/0827; B29C 33/424; G02B 5/0268
(Continued)

(56) References Cited

U.S. PATENT DOCUMENTS 5,141,678 A * 8/1992 Blum ............................ 264/1.7
5,308,740 A * 5/1994 Templeton ................ G03F 7/26
216/61

(Continued)

FOREIGN PATENT DOCUMENTS

JP   07-108536 A   4/1995
JP   2991183 B   10/1999
(Continued)

OTHER PUBLICATIONS

International Search Report dated Sep. 18, 2012 for International application No. PCT/JP2012/065430.
(Continued)

*Primary Examiner* — Lex Malsawma
*Assistant Examiner* — Eric Jones
(74) *Attorney, Agent, or Firm* — Morgan, Lewis & Bockius LLP

(57) ABSTRACT

The invention relates to a mold having an irregularly uneven surface structure in which an average inclination angle is from 20 to 80 degrees; an optical article having an irregularly uneven surface structure in which an average inclination angle is from 20 to 80 degrees; a method for manufacturing an optical article having an irregularly uneven surface structure by transferring an uneven structure of a mold; a transparent substrate for a surface light emitter which uses an optical article having an irregularly uneven surface structure; and a surface light emitter having a transparent substrate for a surface light emitter.

11 Claims, 16 Drawing Sheets

(51) Int. Cl.
  *B29D 11/00* (2006.01)
  *B29C 37/00* (2006.01)
  *B29C 45/37* (2006.01)
  *B29C 33/42* (2006.01)
  *B29L 11/00* (2006.01)
  *B29C 59/10* (2006.01)
  *B29C 59/14* (2006.01)
  *B29C 59/16* (2006.01)
  *B29C 35/08* (2006.01)

(52) U.S. Cl.
  CPC ........ *B29C 37/0067* (2013.01); *B29C 45/372* (2013.01); *B29D 11/00* (2013.01); *B29D 11/0048* (2013.01); *B29D 11/00326* (2013.01); *B29C 59/10* (2013.01); *B29C 59/14* (2013.01); *B29C 59/16* (2013.01); *B29C 2035/0827* (2013.01); *B29C 2035/0833* (2013.01); *B29L 2011/00* (2013.01)

(58) Field of Classification Search
  USPC ............... 425/383, 385; 264/1.64; 164/1.64; 438/22, 27, 29, 32; 257/98, E21.023, 257/E21.038
  See application file for complete search history.

(56) References Cited

U.S. PATENT DOCUMENTS

| | | | | |
|---|---|---|---|---|
| 5,548,670 | A * | 8/1996 | Koike | G02B 5/0236 385/146 |
| 5,770,124 | A * | 6/1998 | Marecki | G02B 5/124 264/1.36 |
| 5,777,710 | A * | 7/1998 | Okada | G02F 1/134336 349/138 |
| 5,814,355 | A * | 9/1998 | Shusta | B29C 33/40 264/1.6 |
| 6,023,338 | A * | 2/2000 | Bareket | G03F 7/70633 257/E21.53 |
| 6,462,818 | B1 * | 10/2002 | Bareket | G03F 7/70633 356/400 |
| 6,917,901 | B2 * | 7/2005 | Bowley, Jr. | G03F 7/70641 430/30 |
| 7,230,703 | B2 * | 6/2007 | Sezginer | G01B 11/26 356/401 |
| 7,515,279 | B2 * | 4/2009 | Raymond | G01B 11/00 356/237.5 |
| 7,678,516 | B2 * | 3/2010 | Monahan | G03F 7/70625 430/22 |
| 2001/0026399 | A1 * | 10/2001 | Nakabayashi et al. | 359/576 |
| 2002/0033916 | A1 * | 3/2002 | Umemoto | G02B 5/021 349/113 |
| 2003/0021465 | A1 * | 1/2003 | Adel | G03F 7/70633 382/151 |
| 2003/0048458 | A1 * | 3/2003 | Mieher | G03F 7/70625 356/601 |
| 2003/0113544 | A1 * | 6/2003 | Tokuda | C08F 290/144 428/413 |
| 2003/0142247 | A1 * | 7/2003 | Nishiyama | G02B 5/0226 349/67 |
| 2003/0197941 | A1 * | 10/2003 | Ohgane | C08F 271/00 359/558 |
| 2004/0040930 | A1 * | 3/2004 | Tanaka | G01N 23/225 216/61 |
| 2004/0070772 | A1 * | 4/2004 | Shchegrov | G01N 21/211 356/625 |
| 2005/0009947 | A1 * | 1/2005 | Ozaki | C08F 20/30 522/184 |
| 2005/0089775 | A1 * | 4/2005 | Archie | G03F 7/70641 430/30 |
| 2006/0036010 | A1 * | 2/2006 | Kim | C04B 26/04 524/437 |
| 2007/0237383 | A1 * | 10/2007 | Funk | G03F 7/70625 382/144 |
| 2007/0238201 | A1 * | 10/2007 | Funk | H01L 22/12 438/14 |
| 2007/0292774 | A1 * | 12/2007 | Ke | G03F 1/14 430/5 |
| 2007/0298522 | A1 * | 12/2007 | Du-Nour | G01B 11/0625 700/121 |
| 2008/0151268 | A1 * | 6/2008 | Archie | G01B 21/045 356/625 |
| 2008/0183412 | A1 * | 7/2008 | Funk | G01B 11/0616 702/97 |
| 2008/0306719 | A1 * | 12/2008 | Freier | G06T 15/50 703/13 |
| 2009/0030104 | A1 * | 1/2009 | Makino | C08F 283/00 522/96 |
| 2009/0050823 | A1 * | 2/2009 | Manassen | G01N 21/8901 250/492.2 |
| 2009/0180185 | A1 * | 7/2009 | Hayashi | 359/566 |
| 2009/0266415 | A1 * | 10/2009 | Rothrock et al. | 136/256 |
| 2010/0044913 | A1 * | 2/2010 | Etori | B29C 33/3842 264/219 |
| 2010/0060142 | A1 | 3/2010 | Itou et al. | |
| 2010/0195197 | A1 * | 8/2010 | Usami | C03C 17/38 359/359 |
| 2011/0081520 | A1 * | 4/2011 | Nojiri | G02F 1/1303 428/141 |
| 2011/0108874 | A1 * | 5/2011 | Chu | B29C 33/68 257/98 |
| 2011/0138506 | A1 * | 6/2011 | Humphris | B82Y 35/00 850/6 |
| 2011/0224956 | A1 * | 9/2011 | Ye | G03F 1/14 703/1 |
| 2011/0295555 | A1 * | 12/2011 | Meessen | G03F 7/705 702/179 |
| 2011/0299270 | A1 * | 12/2011 | Kojima | G02B 5/045 362/97.1 |
| 2012/0013875 | A1 * | 1/2012 | Geraets | G01N 21/93 355/55 |
| 2012/0033193 | A1 * | 2/2012 | Van Der Schaar | G03F 7/70633 355/67 |
| 2012/0132897 | A1 * | 5/2012 | Seki | G02B 5/1809 257/40 |
| 2012/0228601 | A1 * | 9/2012 | Hiyama | G02B 5/0231 257/40 |
| 2013/0011608 | A1 * | 1/2013 | Wolk | B29C 67/202 428/141 |

FOREIGN PATENT DOCUMENTS

| | | | |
|---|---|---|---|
| JP | 2000-96284 A | 4/2000 | |
| JP | 2006-059542 A | 3/2006 | |
| JP | 2006-269328 A | 10/2006 | |
| JP | 2007-187952 A | 7/2007 | |
| JP | 2007-237541 A | 9/2007 | |
| JP | 2008-093971 A | 4/2008 | |
| JP | 2008-250264 A * | 10/2008 | ............ B26C 33/38 |
| JP | 2010-156843 A | 7/2010 | |
| JP | 2010-243572 A | 10/2010 | |
| JP | 2010-260279 A | 11/2010 | |
| JP | 2011-187510 A | 9/2011 | |
| JP | 2012-003074 A | 1/2012 | |
| WO | 2008/001935 A1 | 1/2008 | |
| WO | 2008/069324 A1 | 6/2008 | |

OTHER PUBLICATIONS

Taiwanese Office Action issued in Taiwanese Patent Application No. 101121254 on Jul. 25, 2016.
Notice of Allowance issued in Japanese Patent Application No. 2012-532178 on Dec. 13, 2016.
Notice of Allowance issued in Japanese Patent Application No. 2012-532718 on Dec. 13, 2016.

* cited by examiner

MOLD HAVING AN UNEVEN SURFACE STRUCTURE, OPTICAL ARTICLE, MANUFACTURING METHOD THEREFOR, TRANSPARENT SUBSTRATE FOR SURFACE LIGHT EMITTER AND SURFACE LIGHT EMITTER

TECHNICAL FIELD

The present invention relates to a mold having an irregularly uneven surface structure; an optical article having an irregularly uneven surface structure; a method for manufacturing an optical article having an irregularly uneven surface structure by transferring the uneven structure of the mold; a transparent substrate for a surface light emitter which uses an optical article having an irregularly uneven surface structure; and a surface light emitter having a transparent substrate for a surface light emitter.

The present application claims priority to Japanese Patent Application No. 2011-135214, which has been filed in Japan on Jun. 17, 2011, and Japanese Patent Application No. 2012-063709, which has been filed in Japan on Mar. 21, 2012, and the content of which is incorporated herein by reference.

BACKGROUND ART

As a surface light emitter with a substantially two dimensional radiation surface using an electroluminescence (hereinbelow, described as EL), an organic EL device or an inorganic EL device is known. As the surface light emitter constituted by the organic EL device, a surface light emitter is known including a transparent substrate, a transparent electrode provided on a surface of the transparent substrate, a rear surface electrode that is provided to be spaced from the transparent electrode and is formed of a metal thin film, and a light emitting layer that is provided between the transparent electrode and the rear surface electrode and contains a light emitting material of an organic compound.

In the surface light emitter, when a hole supplied from the transparent electrode and an electron supplied from the rear surface electrode are coupled at the light emitting layer, the light emitting layer emits light. Light emitted from the light emitting layer transmits through the transparent electrode and transparent substrate, and is extracted from a radiation plane (a surface of the transparent substrate). In addition, it is also reflected by the metal thin film of the rear surface electrode, and then transmits through the light emitting layer, the transparent electrode, and the transparent substrate, and is extracted from the radiation plane.

However, in this surface light emitter, when an angle of incidence of light that is incident to the transparent electrode, the transparent substrate, external air, and the like is larger than a critical angle that is determined by a refractive index of a material that is an incidence source and a refractive index of a material that is an incidence destination, the light is totally reflected on an interface between the light emitting layer and the transparent electrode, an interface between the transparent electrode and the transparent substrate, an interface (radiation plane) between the transparent substrate and the external air, and the like, and is trapped inside the surface light emitter. Therefore, there is a problem in that a part of light is not extracted to the outside, and thus light extraction efficiency is low.

As a surface light emitter to solve this problem, the following surface light emitter has been suggested.

An organic EL device in which a diffraction grating constituted by a periodic uneven structure is formed on a surface of a transparent electrode side of a transparent substrate (Patent Literature 1).

In that organic EL device, the light emitted from the light emitting layer is diffracted by the diffraction grating in such a manner that the angle of incidence of the light that is incident to the transparent electrode, the transparent substrate, and the external air decreases, and thus the total reflection on the respective interfaces is reduced, and the light extraction efficiency is improved.

In addition, as a method for obtaining a large size optical article having an uneven surface structure and producing it with favorable productivity, the following method has been suggested.

A method for producing an anti-glare film by transferring, onto a surface of a transparent resin film, an uneven structure of a mold having an uneven structure which is formed by colliding microparticles on a surface plated with copper or nickel (Patent Literatures 2 and 3).

CITATION LIST

Patent Literature

Patent Literature 1: Japanese Patent No. 2991183
Patent Literature 2: JP 2007-187952 A
Patent Literature 3: JP 2007-237541 A

SUMMARY OF INVENTION

Technical Problems

However, the organic EL device disclosed in Patent Literature 1 has the following problems.

When manufacturing the organic EL device, since an uneven structure is formed on a surface of the transparent substrate by a photolithographic method, it takes time to manufacture a transparent substrate having an uneven surface structure and it is also difficult to produce it in a large area. For such reasons, it is impossible to manufacture a transparent substrate having an uneven surface structure with favorable productivity.

A transparent substrate having a periodic uneven surface structure with high regularity shows a huge angle-dependent variation in hue of emitted light.

Further, the anti-glare film obtained by the method described in Patent Literatures 2 and 3 has the following problems.

Since the uneven structure is shallow in the anti-glare film, the inclination angle on an uneven surface is small. For such reasons, the incident light cannot be sufficiently diffused with the anti-glare film. Further, even when the anti-glare film is used as a transparent substrate for an organic EL device, an increase in light extraction efficiency cannot be expected.

Since the inclination angle on an uneven surface of the anti-glare film is small, hue of emitted light varies greatly depending on angle.

The invention provides a mold allowing obtaining an optical article having an uneven surface structure, which can efficiently diffract or diffuse incident light and has little angle-dependent variation in hue of emitted light, and allowing manufacturing it with a large area and favorable productivity; an optical article having an uneven surface structure, which can efficiently diffract or diffuse incident light and has little angle-dependent variation in hue of emitted light; a manufacturing method allowing obtaining an optical article having an uneven surface structure, which can efficiently diffract or diffuse incident light and has little angle-dependent variation in hue of emitted light, and allowing manufacturing it with favorable productivity; a transparent substrate for a surface light emitter allowing obtaining a surface light emitter having high light extraction efficiency and little angle-dependent variation in hue of emitted light; and a surface light emitter having high light extraction efficiency and little angle-dependent variation in hue of emitted light.

Solution to Problem

The invention relates to the mold of (1) to (7), optical article having an uneven surface structure of (8), (9) and (11), method for manufacturing an optical article having an uneven surface structure of (10), transparent substrate for a surface light emitter of (12), and surface light emitter of (13).

(1) A mold having an irregularly uneven surface structure and an average inclination angle of 20 to 80 degrees as measured by the method described below.

(2) The mold of (1), in which the uneven structure consists of a metal.

(3) The mold of (2), in which the metal is nickel, a nickel alloy, copper, or a copper alloy.

(4) A mold having an uneven surface structure consisting of a metal and a total reflectance of 1 to 30% from a surface on the side having the uneven structure as measured using light source C according to JIS K 7105.

(5) The mold of (4), in which the metal is nickel, a nickel alloy, copper, or a copper alloy.

(6) A mold having an uneven surface structure which consists of plural needle-like protrusions consisting of a metal.

(7) The mold of (6), in which the metal is nickel, a nickel alloy, copper, or a copper alloy.

(8) A method for manufacturing an optical article having an uneven surface structure including steps of placing an active energy ray curable resin composition between any mold of (1) to (7) or a replica mold having the uneven structure of the mold transferred on a surface of a replica mold substrate and a substrate for an optical article, forming, on a surface of the substrate for an optical article, an uneven resin layer transferred with the uneven structure of the mold or the replica mold by irradiating the active energy ray curable resin composition with active energy ray to cure the active energy ray curable resin composition, and releasing the optical article having the uneven resin layer and the substrate for an optical article from the mold or the replica mold.

(9) An optical article having an uneven surface structure which is manufactured by the manufacturing method of (8).

(10) An optical article having an uneven surface structure, which has an irregularly uneven structure and an average inclination angle of 20 to 80 degrees as measured by the method described below.

(11) The optical article having an uneven surface structure of (10), which has a diffusion factor of 5 to 80% as obtained by the method described below.

(12) A transparent substrate for a surface light emitter consisting of the optical article having an uneven surface structure according to any one of (9) to (11), or the optical article having an uneven surface structure according to any one of (9) to (11) that is provided with a high refractive index layer on a surface of the uneven resin layer.

(13) A surface light emitter having the transparent substrate for a surface light emitter of (12), a transparent electrode formed on a surface of the transparent substrate for a surface light emitter, a rear surface electrode that is formed to be spaced from the transparent electrode, and a light emitting layer that is formed between the transparent electrode and the rear surface electrode.

Advantageous Effects of Invention

With the mold of the invention, an optical article having an uneven surface structure, which can efficiently diffract or diffuse incident light and has little angle-dependent variation in hue of emitted light, can be manufactured in a large area and also with favorable productivity.

The optical article having an uneven surface structure according to the invention can efficiently diffract or diffuse incident light and has little angle-dependent variation in hue of emitted light.

With the method for manufacturing an optical article having an uneven surface structure according to the invention, an optical article having an uneven surface structure, which can efficiently diffract or diffuse incident light and has little angle-dependent variation in hue of emitted light, can be manufactured in a large area and also with favorable productivity.

With the transparent substrate for a surface light emitter according to the invention, a surface light emitter having high light extraction efficiency and little angle-dependent variation in hue of emitted light can be obtained.

The surface light emitter of the invention has high light extraction efficiency and little angle-dependent variation in hue of emitted light.

DESCRIPTION OF EMBODIMENTS

Figure 1:
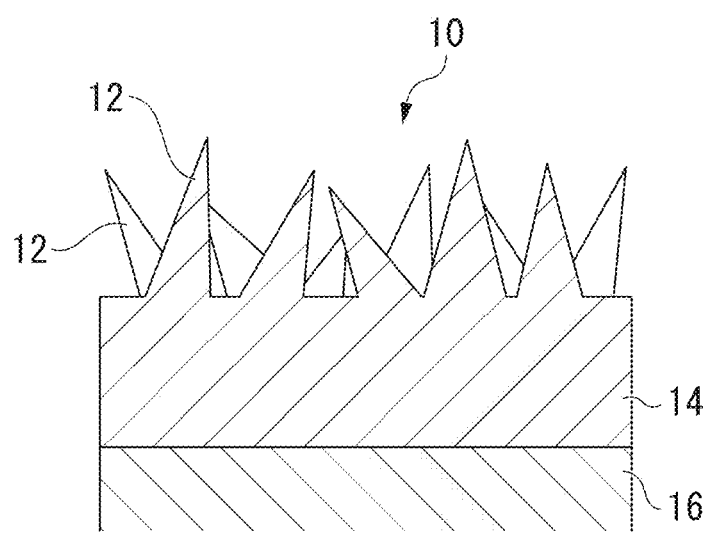
FIG. 1 is a cross-sectional view illustrating an example of plating film.

In the invention, the average inclination angle of an uneven surface is obtained by the following method.

From a cross-sectional photographic image of a mold or an optical article taken by a scanning electron microscope, a photographic image of the uneven structure is collected for the length L (10 μm), which is a standard length in direction x perpendicular to height direction y of the uneven structure. The collected photographic image of the uneven structure is digitalized and the ridge line of the uneven structure is transformed into a xy coordinate. From the obtained coordination data of the ridge line (y=f(x)), the average inclination angle θa is obtained by the following equation. The average inclination angle θa is obtained similarly for 20 spots in total, and their average value is obtained.

$$\theta a = \tan^{-1}\left(\frac{1}{L}\int\left|\frac{df(x)}{dx}\right|dx\right) \quad \text{[Mathematical equation 1]}$$

In the invention, the diffusion factor corresponds to the diffusion factor described in German Federation Standards DIN5036, and it is obtained by the following method.

In the height direction of the uneven structure (0 degree direction), laser light is applied to an optical article. Intensity $I_0$ of the transmitted diffusion light, which is emitted after transmission through the optical article, is measured. From the intensity when exit angle θ is 5 degrees, 20 degrees, and 70 degrees, the diffusion factor D is obtained by the following equation.

$$D = \frac{(B_{70} + B_{20})/2}{B_5} \times 100 \quad \text{[Mathematical equation 2]}$$
$$B_0 = I_0/\cos\theta$$

Mean spacing Sm between uneven protrusions is obtained by the following method.

From a cross-sectional photographic image of a mold or an optical article taken by a scanning electron microscope, a photographic image of the uneven structure is collected for the length L (10 μm), which is a standard length in direction x perpendicular to height direction y of the uneven structure. The collected photographic image of the uneven structure is digitalized and the ridge line of the uneven structure is transformed into a xy coordinate. From the obtained coordination data of the ridge line (y=f(x)), mean spacing Sm between uneven protrusions is obtained by dividing total of Smi, which is the length of average line covering from one mountain to a neighboring valley (that is, one uneven protrusion), by the number n of uneven protrusions according to JIS B 0601-1994. The mean spacing Sm of uneven protrusions is obtained similarly for 20 spots in total, and their average value is obtained.

$$Sm = \frac{1}{n}\sum_{i=1}^{n} Smi \quad \text{[Mathematical equation 3]}$$

Mean spacing S between local mountain tops is obtained by the following method.

From a cross-sectional photographic image of a mold or an optical article taken by a scanning electron microscope, a photographic image of the uneven structure is collected for the length L (10 μm), which is a standard length in direction x perpendicular to height direction y of the uneven structure. The collected photographic image of the uneven structure is digitalized and the ridge line of the uneven structure is transformed into a xy coordinate. From the obtained coordination data of the ridge line (y=f(x)), mean spacing S between local mountain tops is obtained by dividing total of Si, which is the length of average line corresponding to neighboring local mountain tops, by the number n of a pair of local mountain tops according toils B 0601-1994. The mean spacing S between local mountain tops is obtained similarly for 20 spots in total, and their average value is obtained.

$$S = \frac{1}{n}\sum_{i=1}^{n} Si \qquad \text{[Mathematical equation 4]}$$

Arithmetic mean roughness Ra, maximum height Ry, 10-point average height Rz, and root mean square roughness RMS are obtained for a measurement area of 50 μm×50 μm by measurement using atomic force microscopy according to JIS B0601-1994.

The irregularly uneven structure described in the invention means that shapes of mountain and valley constituting an uneven structure (i.e., uneven protrusions) or spacing therebetween is irregular. Specifically, it means that the inclination angle of an uneven surface, spacing between uneven protrusions, and spacing between local mountain tops have a deviation.

Transparency means that it allows transmission of visible light (it has a light transmitting property), Active energy ray means visible ray, ultraviolet ray, electron ray, plasma, thermal ray (infrared ray or the like), or the like.

(Meth)acrylate means acrylate or methacrylate.

<Mold>

(First Embodiment)

The first embodiment of the mold of the invention is a mold having an irregularly uneven surface structure, in which the uneven surface has an average inclination angle of 20 to 80 degrees.

Since a mold having an uneven surface with an average inclination angle of 20 degrees or higher has a high aspect ratio (height/spacing) of uneven protrusions, the total reflectance is sufficiently low. Specific examples of a mold having an uneven surface with an average inclination angle of 20 degrees or higher include a mold having an uneven surface structure which consists of plural needle-like protrusions.

The average inclination angle of an uneven surface is 20 to 80 degrees, preferably 25 to 75 degrees, and more preferably 30 to 70 degrees. When the average inclination angle is 20 degrees or higher, incident light can be efficiently diffracted or diffused and angle-dependent variation in hue of emitted light is small in an optical article that is formed by transferring the uneven structure of a mold. Further, when the average inclination angle is 80 degrees or lower, the aspect ratio (height/spacing) of uneven protrusions is not excessively high so that releasability is improved and the optical article can be produced with favorable productivity.

As for the mold, a mold having a diffusion factor of 5 to 80% in an optical article that is formed by transferring the uneven structure of a mold is preferable. When the diffusion factor is 5% or more, the uneven structure becomes irregular, and incident light can be efficiently diffracted or diffused by the uneven structure in an optical article that is formed by transferring the uneven structure of a mold. Further, when the diffusion factor of 80% or less, angle varying activity of light is not excessively high so that a decrease in the light extraction efficiency in a surface light emitter described below can be suppressed. The diffusion factor is more preferably 7 to 75%, and even more preferably 10 to 70%.

From the viewpoint of easy formation of irregularly uneven structure and excellent durability as a mold, the material for an uneven structure is preferably a metal. From the viewpoint of easy formation of needle-like protrusions, the metal is preferably nickel, a nickel alloy, copper, or a copper alloy. From the viewpoint of easy formation of needle-like protrusions, the uneven structure is preferably a metal plating film.

(Second Embodiment)

The second embodiment of the mold of the invention is a mold having an uneven surface structure consisting of a metal and a total reflectance of 1 to 30% from a surface on the side having the uneven structure as measured using light source C according to JIS K 7105. The uneven structure is preferably irregular.

A total reflectance of 30% or less from a surface on the side having the uneven structure means that the aspect ratio (height/spacing) of uneven protrusions is high, that is, the average inclination angle of an uneven surface is high, so that light reflection on a metal surface is suppressed. Typical metal surface never has a total reflectance of 30% or less. The total reflectance of 30% or less of a surface means that the surface of metal has a special shape, specifically, it consists of plural needle-like protrusions consisting of a metal.

A total reflectance from a surface on the side having the uneven structure is 1 to 30%, preferably 1.5 to 25%, and more preferably 2 to 20%. When the total reflectance is 1% or more, the aspect ratio (height/spacing) of uneven protrusions is not excessively high so that releasability is improved and an optical article can be manufactured with favorable productivity. Further, when the total reflectance is 30% or less, incident light can be efficiently diffracted or diffused in an uneven structure of an optical article that is formed by transferring the uneven structure of a mold, and angle-dependent variation in hue of emitted light is small.

As a metal, nickel, a nickel alloy, copper, or a copper alloy is preferable from the viewpoint of easy formation of needle-like protrusions. As an uneven structure, a metal plating film is preferable from the viewpoint of easy formation of needle-like protrusions.

(Third Embodiment)

The third embodiment of the mold of the invention is a mold having an uneven surface structure, which consists of plural needle-like protrusions consisting of a metal. The uneven structure is preferably irregular.

The uneven structure consisting of plural needle-like protrusions has a high aspect ratio (height/spacing) of uneven protrusions so that the average inclination angle on an uneven surface is high and the total reflectance is sufficiently low.

FIG. 1 is a cross-sectional view illustrating an example of the third embodiment of the mold of the invention. In the mold 10, the plating film 14 having an uneven surface structure, which consists of plural needle-like protrusions 12 that are formed by precipitating a metal in a needle-like shape (or approximately conical shape or approximately pyramidal shape), is formed on a surface of the mold substrate 16.

The protrusions 12 may have an approximately conical shape or approximately pyramidal shape having precipitated needle-like metal, as shown in FIG. 1, or have a branch shape having small protrusions that are formed with precipitated needle-like metal on a surface of the protrusions 12 (not illustrated). The center axis of part of the protrusions 12 may be tilted in the direction which is perpendicular to the surface of the mold substrate 16, as shown in FIG. 1.

As for the metal of the plating film 14, nickel, a nickel alloy, copper, or a copper alloy is preferable from the viewpoint of easy formation of the needle-like protrusions 12.

Examples of the material for the mold substrate 16 include a metal (aluminum, nickel, copper, SUS, or the like), a resin (polyethylene terephthalate, an acrylic resin, or the like), and glass.

Examples of the shape of the mold substrate 16 include a plate shape, a shape obtained by processing a plate into a tubular shape or an endless belt shape, and a roll shape.

The mold 10 can be available as "needle-like nickel alloy plating" or "needle-like copper alloy plating" from Ebina Denka Kogyo Co., Ltd.

(First Embodiment to Third Embodiment)

In the uneven structure according to the first embodiment to third embodiment of the invention (hereinbelow, all of them are simply described as the "mold"), average spacing Sm between the uneven protrusions is preferably 200 to 100,000 nm, more preferably 250 to 50,000 nm, and even more preferably 300 to 10,000 nm. When the average spacing Sm between the uneven protrusions is 200 nm or more, a structure for having a high anti-reflection effect is not obtained in an optical article that is formed by transferring the uneven structure of a mold, and thus a decrease in light diffusion effect can be suppressed. When the average spacing Sm between the uneven protrusions is 100,000 nm or less, an angle varying activity of light is not lowered in an optical article that is formed by transferring the uneven structure of a mold, and thus the incident light can be efficiently diffracted or diffused.

The mean spacing S between local mountain tops in an uneven structure of the mold is preferably 150 to 80,000 nm, more preferably 200 to 20,000 nm, and more preferably 250 to 5,000 nm. When the mean spacing S between local mountain tops is 150 nm or more, a structure for having a high anti-reflection effect is not obtained in an optical article that is formed by transferring the uneven structure of a mold, and thus a decrease in light diffusion effect can be suppressed. When the mean spacing S between local mountain tops in an uneven structure is 80,000 nm or less, an angle varying activity of light is not lowered in an optical article that is formed by transferring the uneven structure of a mold, and thus the incident light can be efficiently diffracted or diffused.

Arithmetic mean roughness Ra of a surface on the side having the uneven structure of the mold is preferably 5 to 1,000 nm, and more preferably 10 to 500 nm, from the viewpoint of sufficiently increasing the light extraction efficiency of the surface light emitter described below.

The maximum height Ry of a surface on the side having the uneven structure of the mold is preferably 10 to 10,000 nm, and more preferably 50 to 5,000 nm, from the viewpoint of sufficiently increasing the light extraction efficiency of the surface light emitter described below.

The 10-point average height Rz of a surface on the side having the uneven structure of the mold is preferably 5 to 5,000 nm, and more preferably 25 to 2,500 nm, from the viewpoint of sufficiently increasing the light extraction efficiency of the surface light emitter described below.

The root mean square roughness RMS of a surface on the side having the uneven structure of the mold is preferably 5 to 1,000 nm, and more preferably 10 to 500 nm, from the viewpoint of sufficiently increasing the light extraction efficiency of the surface light emitter described below.

Examples of the shape of the mold include a plate shape, a shape obtained by processing a plate into a tubular shape or an endless belt shape, and a roll shape.

Surface of the mold is preferably treated with a releasing agent.

(Working Effect)

According to the first embodiment of the mold of the invention, because an irregularly uneven structure is present on the surface and the average inclination angle on the uneven surface is 20 degrees or higher, it is possible to manufacture an optical article having an uneven surface structure, which can efficiently diffract or diffuse incident light and has little angle-dependent variation in hue of emitted light. By transferring the uneven structure of a mold on a surface of a substrate for an optical article, it is possible to enlarge the size of an optical article having an uneven surface structure and manufacture it with favorable productivity.

According to the second embodiment of the mold of the invention, because the total reflectance is 30% or less on a surface having the uneven structure, it is possible to manufacture an optical article having an uneven surface structure, which can efficiently diffract or diffuse incident light and has little angle-dependent variation in hue of emitted light. By transferring the uneven structure of a mold on a surface of a substrate for an optical article, it is possible to enlarge the size of an optical article having an uneven surface structure and manufacture it with favorable productivity.

According to the third embodiment of the mold of the invention, because an uneven structure consisting of plural needle-like protrusions consisting of a metal is present on the surface, the average inclination angle of the uneven surface is high and the total reflectance is sufficiently low. By using the mold, it is possible to manufacture an optical article having an uneven surface structure, which can efficiently diffract or diffuse incident light and has little angle-dependent variation in hue of emitted light. By transferring the uneven structure of a mold on a surface of a substrate for an optical article, it is possible to enlarge the size of an optical article having an uneven surface structure and manufacture it with favorable productivity.

<Method for Manufacturing Optical Article Having Uneven Surface Structure>

The method for manufacturing an optical article having an uneven surface structure according to the invention is a method including the following steps (I) to (III).

(I) placing an active energy ray curable resin composition between the mold of the invention and a substrate for an optical article, (II) forming, on a surface of the substrate for an optical article, an uneven resin layer transferred with the uneven structure of the mold by irradiating the active energy ray curable resin composition with active energy ray to cure the active energy ray curable resin composition, and (III) releasing the optical article having the uneven resin layer and the substrate for an optical article from the mold.

(Step (I))

Figure 2:
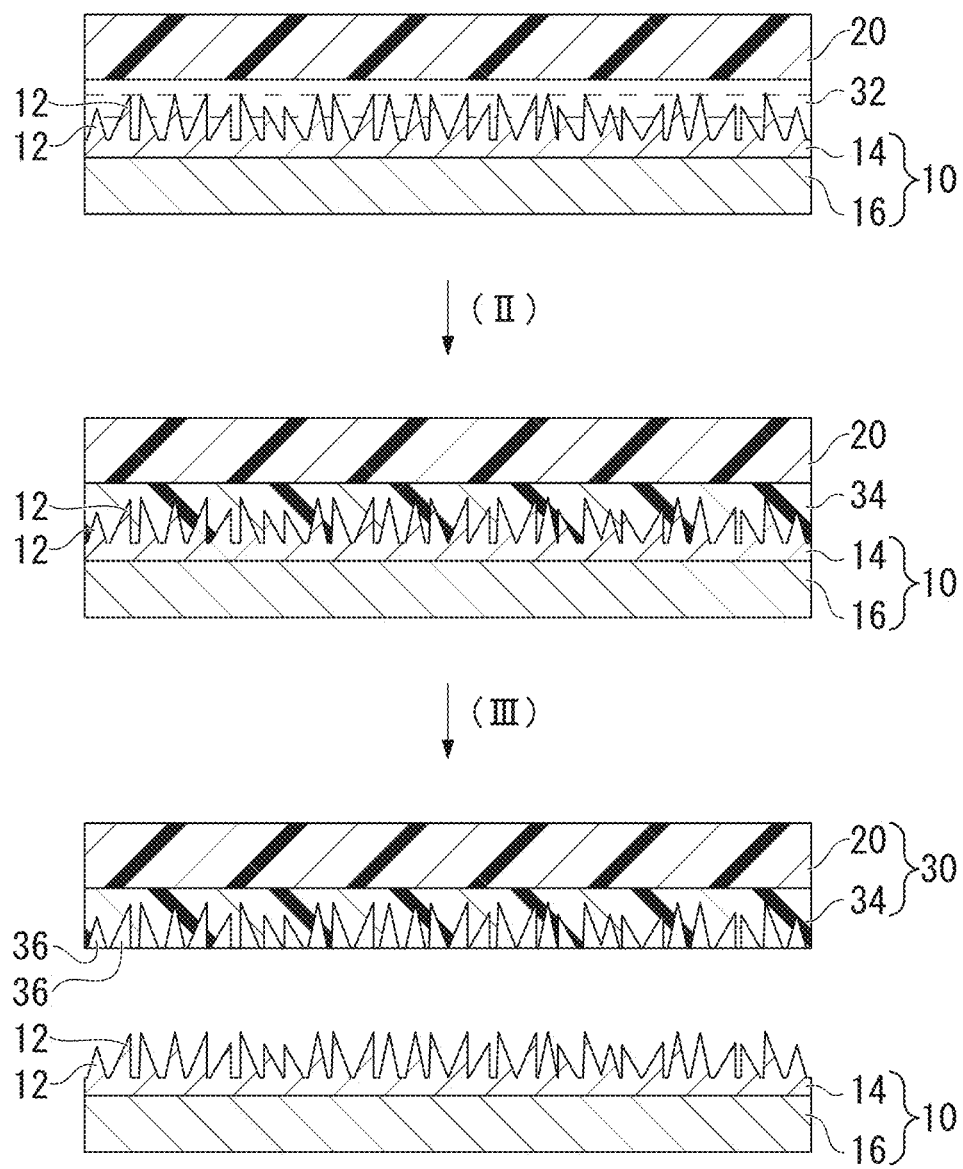
FIG. 2 is a cross-sectional view illustrating an example of the process for manufacturing the optical article having an uneven surface structure according to the invention.

As shown in FIG. 2, the active energy ray curable resin composition 32 is placed between the surface on the side having the uneven structure of the mold 10 and the surface of the substrate 20 for an optical article.

The mold 10 may be a mold having an irregularly uneven surface structure, in which the uneven surface has an average inclination angle of 20 to 80 degrees (first embodiment), a mold having an uneven surface structure, in which a total reflectance from the surface on the side having the uneven structure of the mold is 1 to 30% (second embodiment), or a mold having an uneven surface structure, which consists of plural needle-like protrusions consisting of a metal (third embodiment). It also may be a mold which satisfies two or more of the one having an irregularly uneven surface structure, in which the uneven surface has an average inclination angle of 20 to 80 degrees, the one having an uneven surface structure, in which a total reflectance from the surface on the side having the uneven structure of the mold is 1 to 30%, and the one having an uneven surface structure, which consists of plural needle-like protrusions consisting of a metal. From the viewpoint of further improving the effect of the invention, it is preferably the one which satisfies two or more of them, and more preferably the one which satisfied all three of them.

The illustrated mold 10 is an exemplary mold in which the plating film 14 having an uneven surface structure which consists of plural needle-like protrusions 12 is formed on a surface of the mold substrate 16.

As for the substrate 20 for an optical article, a substrate capable of transmitting active energy ray is used.

Examples of a material of the substrate 20 for an optical article include polyester (such as polyethylene terephthalate, polybutylene terephthalate, or polyethylene naphthalate), an acrylic resin (such as polymethyl methacrylate), polycarbonate, polyvinyl chloride, a styrene-based resin (ABS resin), a cellulose-based resin (such as triacetyl cellulose), a polyimide-based resin (such as polyimide resin or polyimide amide resin), and glass. When a resin is used as a material of the substrate 20 for an optical article, various barrier films (such as multi-laminated film of SiO/SiN or resin-based barrier film) may be formed on a surface of the substrate 20 for an optical article.

Exemplary shapes of the substrate 20 for an optical article include a film, a sheet, and a plate.

The substrate 20 for an optical article may be subjected in advance to a surface treatment. Examples of the surface treatment include an ultraviolet treatment, a corona treatment, a plasma treatment, an excimer lamp treatment, and an UV ozone treatment.

The substrate 20 for an optical article may have an adhesive layer on a surface which is in contact with the active energy ray curable resin composition 32.

The adhesive layer is a layer consisting of known adhesives. As for the adhesives, adhesives containing a silane coupling agent having a (meth)acryloyloxy group are preferable.

Placing the active energy ray curable resin composition 32 between the mold 10 and the substrate 20 for an optical article can be carried out by pressing the mold 10 against the active energy ray curable resin composition 32, which has been coated on a surface of the substrate 20 for an optical article, or by pressing the substrate 20 for an optical article against the active energy ray curable resin composition 32, which has been coated on a surface on the side of the uneven structure of the mold 10.

Examples of a method for coating the active energy ray curable resin composition 32 include bar coating, dip coating, spray coating, roll coating, gravure coating, flexo coating, screen coating, spin coating, flow coating, and ink jet.

By pre-baking the active energy ray curable resin composition 32 before completely curing it after coating, curing of the active energy ray curable resin composition 32 can be promoted. Examples of a heating method for pre-baking include irradiation using an ultraviolet heater, a circulating heating using hot air, and a direct heating using a hot plate or the like. As for the heating temperature, a temperature for having 50 to 120° C. of the active energy ray curable resin composition 32 is preferable. As for the heating time, it is preferably 5 seconds to 3600 minutes, more preferably 30 seconds to 30 minutes, and even more preferably 1 minute to 10 minutes.

It is also possible to promote curing of the active energy ray curable resin composition 32 by evaporating a solvent from the coated active energy ray curable resin composition 32 in vacuum. At that time, heating can be also suitably employed. A temperature for heating in vacuum is preferably the temperature which makes the active energy ray curable resin composition 32 to have from room temperature to 120° C. Time for solvent evaporation under vacuum is preferably 1 minute to 3600 minutes, and more preferably 1 minute to 120 minutes.

As for the active energy ray curable resin composition 32, a composition for having a Martens hardness of 150 or less for an uneven resin layer is preferable, when it is formed under the same condition as the steps (I) and (II). When a Martens hardness of an uneven resin layer is 150 or less, the central axis of the protrusions 12 of the mold 10 is tilted in a direction perpendicular to the surface of the mold substrate 16, and even when an uneven resin layer is formed to mesh the tilted protrusions 12 during the step (II), the uneven resin layer can be deformed when the first optical article 30 is released from the mold 10 during the step (III), and thus the releasability at the time of releasing the first optical article 30 from the mold 10 is excellent. A Martens hardness of an uneven resin layer is preferably 145 or lower, more preferably 140 or lower, and even more preferably 60 or lower.

Measurement of the Martens hardness is performed using Fischerscope HM2000. The indenter used for the measurement is a diamond pyramid having a facing angle of 135 degrees. Under an environment having a temperature of 23° C. and a relative humidity of 50%, the indenter is pressed against the uneven resin layer up to 1 mN for 20 seconds until $dF/dt^2$ (F: load and t: elapsed time) becomes constant and then subjected to creeping for 5 seconds. After that, under a measurement condition in which the load is removed under the same condition as the load application, the load is divided by the surface area of the indenter which makes an invasion over the zero contact point, and a Martens hardness is obtained accordingly.

As for the active energy ray curable resin composition 32, from the viewpoint of excellent adhesiveness to the substrate 20 for an optical article, a resin composition coating including a monomer and/or an oligomer having a (meth)acryloyloxy group is preferable.

The active energy ray curable resin composition 32 contains a polymerizable compound and a polymerization initiator.

Examples of the polymerizable compound include a monomer, an oligomer, and a reactive polymer which has a radically polymerizable bond or a cationically polymerizable bond in the molecule.

Examples of the monomer having a radically polymerizable bond include a monofunctional monomer and a polyfunctional monomer.

Examples of the monofunctional monomers include (meth)acrylate derivatives such as methyl (meth)acrylate, ethyl (meth)acrylate, propyl (meth)acrylate, n-butyl (meth)acrylate, i-butyl (meth)acrylate, s-butyl (meth)acrylate, t-butyl (meth)acrylate, 2-ethylhexyl (meth)acrylate, lauryl (meth)acrylate, alkyl (meth)acrylate, tridecyl (meth)acrylate, stearyl (meth)acrylate, cyclohexyl (meth)acrylate, benzyl (meth)acrylate, phenoxyethyl (meth)acrylate, isobornyl (meth)acrylate, glycidyl (meth)acrylate, tetrahydrofurfuryl (meth)acrylate, allyl (meth)acrylate, 2-hydroxyethyl (meth)acrylate, hydroxypropyl (meth)acrylate, 2-methoxyethyl (meth)acrylate, or 2-ethoxyethyl (meth)acrylate; (meth)acrylic acid, (meth)acrylonitrile; styrene derivatives such as styrene or α-methyl styrene; (meth)acrylamide derivatives such as (meth)acrylamide, N-dimethyl (meth)acrylamide, N-diethyl (meth)acrylamide, or dimethylaminopropyl (meth)acrylamide. These compounds may be used either singly or in combination of two or more kinds.

Examples of the polyfunctional monomers include bifunctional monomers such as ethylene glycol di(meth)acrylate, tripropylene glycol di(meth)acrylate, ethylene oxide isocyanurate-modified di(meth)acrylate, triethylene glycol di(meth)acrylate, diethylene glycol di(meth)acrylate, neopentyl glycol di(meth)acrylate, 1,6-hexanediol di(meth)acrylate, 1,5-pentanediol di(meth)acrylate, 1,3-butylene glycol di(meth)acrylate, polybutylene glycol di(meth)acrylate, 2,2-bis(4-(meth)acryloxypolyethoxyphenyl) propane, 2,2-bis(4-(meth)acryloxyethoxyphenyl)propane, 2,2-bis(4-(3-(meth)acryloxy-2-hydroxypropoxy)phenyl) propane, 1,2-bis(3-(meth)acryloxy-2-hydroxypropoxy)ethane, 1,4-bis(3-(meth)acryloxy-2-hydroxypropoxy)butane, dimethyloltricyclodecane di(meth)acrylate, bisphenol A ethylene oxide adduct di(meth)acrylate, bisphenol A propylene oxide adduct di(meth)acrylate, neopentyl glycol hydroxypivalate di(meth)acrylate, divinylbenzene, or methylene bisacrylamide; trifunctional monomers such as pentaerythritol tri(meth)acrylate, trimethylol propane tri(meth)acrylate, trimethylol propane ethylene oxide-modified tri(meth)acrylate, trimethylol propane propylene oxide-modified triacrylate, trimethylol propane ethylene oxide-modified triacrylate, or ethylene oxide isocyanurate-modified tri(meth)acrylate; tetrafunctional or higher monomers such as condensation reaction mixtures of succinic acid/trimethylol ethane/acrylic acid, dipentaerythritol hexa(meth)acrylate, dipentaerythritol penta(meth)acrylate, ditrimethylol propane tetraacrylate, or tetramethylol methane tetra(meth)acrylate; bifunctional or higher urethane acrylates, bifunctional or higher polyester acrylates, and the like. These compounds may be used either singly or in combination of two or more kinds.

Examples of the monomers having a cationically polymerizable bond include monomers having an epoxy group, an oxetanyl group, an oxazolyl group, a vinyloxy group, and the like, and monomers having an epoxy group are particularly preferable.

Examples of the oligomers or reactive polymers include unsaturated polyesters such as condensation products of an unsaturated dicarboxylic acid and a polyhydric alcohol, polyester (meth)acrylates, polyether (meth)acrylates, polyol (meth)acrylates, epoxy (meth)acrylates, urethane (meth)(meth)acrylates, cationically polymerizable epoxy compounds, and homopolymers or copolymers of the above-described monomers having a radically polymerizable bond on a side chain.

In a case of using a photocuring reaction, examples of the photopolymerization initiator include carbonyl compounds such as benzoin, benzoin methyl ether, benzoin ethyl ether, benzoin isopropyl ether, benzoin isobutyl ether, benzil, benzophenone, p-methoxybenzophenone, 2,2-diethoxyacetophenone, α,α-dimethoxy-α-phenyl acetophenone, methyl phenylglyoxylate, ethyl phenylglyoxylate, 4,4'-bis(dimethylamino)benzophenone, or 2-hydroxy-2-methyl-1-phenylpropan-1-one; sulfur compounds such as tetramethylthiuram monosulfide or tetramethylthiuram disulfide; 2,4,6-trimethylbenzoyl diphenylphosphine oxide, and benzoyl diethoxyphosphine oxide. These compounds may be used either singly or in combination of two or more kinds.

In a case of using an electron ray curing reaction, examples of the polymerization initiator include benzophenone, 4,4-bis(diethylamino)benzophenone, 2,4,6-trimethylbenzophenone, methyl ortho-benzoylbenzoate, 4-phenylbenzophenone, t-butylanthraquinone, 2-ethylanthraquinone, thioxanthones such as 2,4-diethylthioxanthone, isopropylthioxanthone, or 2,4-dichlorothioxanthone; acetophenones such as diethoxyacetophenone, 2-hydroxy-2-methyl-1-phenylpropan-1-one, benzyl dimethyl ketal, 1-hydroxycyclohexyl phenyl ketone, 2-methyl-2-morpholino(4-thiomethylphenyl)propan-1-one, or 2-benzyl-2-dimethylamino-1-(4-morpholinophenyl)butanone; benzoin ethers such as benzoin methyl ether, benzoin ethyl ether, benzoin isopropyl ether, or benzoin isobutyl ether; acylphosphine oxides such as 2,4,6-trimethylbenzoyl diphenylphosphine oxide, bis(2,6-dimethoxybenzoyl)-2,4,4-trimethylpentylphosphine oxide, or bis(2,4,6-trimethylbenzoyl)-phenylphosphine oxide; methylbenzoyl formate, 1,7-bisacridinylheptane, and 9-phenylacridine. These compounds may be used either singly or in combination of two or more kinds.

In a case of using a thermal curing reaction, examples of the thermal polymerization initiator include organic peroxides such as methyl ethyl ketone peroxide, benzoyl peroxide, dicumyl peroxide, t-butyl hydroperoxide, cumene hydroperoxide, t-butyl peroxyoctoate, t-butyl peroxybenzoate, or lauroyl peroxide; azo compounds such as azobisisobutyronitrile; redox polymerization initiators obtained by combining the above-described organic peroxide with an amine such as N,N-dimethylaniline or N,N-dimethyl-p-toluidine.

The amount of the polymerization initiator is preferably 0.1 to 10 parts by weight relative to 100 parts by weight of the polymerizable compound. When the amount of the polymerization initiator is 0.1 parts by weight or more, it is easy for the polymerization to proceed. When the amount of the polymerization initiator is 10 parts by weight or less, the coloration or a decrease in the mechanical strength of the cured film can be suppressed.

The active energy ray curable resin composition 32 may also include additives such as unreactive polymers, active energy ray sol-gel reactive compositions, antistatic agents, and fluorine compounds for improving the anti-fouling properties, fine particles, and small amounts of solvents as necessary.

Examples of the unreactive polymers include acrylic resins, styrene-based resins, polyurethanes, cellulose-based resins, polyvinyl butyral, polyesters, thermoplastic elastomers, and the like.

Examples of the active energy ray sol-gel reactive compositions include alkoxysilane compounds, alkyl silicate compounds, and the like.

Examples of the alkoxysilane compounds include tetramethoxysilane, tetra-i-propoxysilane, tetra-n-propoxysilane, tetra-n-butoxysilane, tetra-sec-butoxysilane, tetra-t-butoxysilane, methyltriethoxysilane, methyltripropoxysilane, methyltributoxysilane, dimethyldimethoxysilane, dimethyldiethoxysilane, trimethylethoxysilane, trimethylmethoxysilane, trimethylpropoxysilane, trimethylbutoxysilane, and the like.

(Step (II))

As shown in FIG. 2, by curing the active energy ray curable resin composition 32 by irradiation of the active energy ray curable resin composition 32 with active energy ray, the uneven resin layer 34 transferred with the uneven structure of the mold 10 is formed on a surface of the substrate 20 for an optical article.

The active energy ray is irradiated from the side of the substrate 20 for an optical article.

When the active energy ray is irradiated, by disposing a mask (not illustrated) having a light transmitting part and a light shielding part between the light source and the substrate 20 for an optical article, the uneven resin layer 34 can be formed with a desired shape and size.

Preferred examples of the active energy ray include vacuum ultraviolet ray, ultraviolet ray, and visible ray. The active energy ray may be used either singly or in combination of two or more kinds.

The irradiation time and irradiation amount of the active energy ray are preferably adjusted such that, in case of ultraviolet ray, the integrated light amount is in the range of 100 to 5,000 mJ/cm$^2$.

Examples of the light source include a low pressure mercury lamp, a medium pressure mercury lamp, a high pressure mercury lamp, a ultrahigh pressure mercury lamp, an incandescent lamp, a xenon lamp, a halogen lamp, a carbon arc lamp, a metal halide lamp, a fluorescent lamp, a tungsten lamp, a gallium lamp, an excimer lamp, and the sun. Among them, a low pressure mercury lamp, a medium pressure mercury lamp, a high pressure mercury lamp, an ultrahigh pressure mercury lamp, and a metal halide lamp are preferable.

For curing the active energy ray curable resin composition 32, heating may be also performed in combination with irradiation of active energy ray, if necessary.

With regard to the timing of heating, at least one time point may be selected from before the irradiation of active energy ray, the same time as the irradiation of active energy ray, and after the irradiation of active energy ray.

As for the heating method, irradiation using an infrared heater, a circulating heating using hot air, and a direct heating using a hot plate can be mentioned. As for the heating temperature, a temperature for making the active energy ray curable resin composition 32 to have from 50 to 120° C. is preferable. As for the heating time, it is preferably 1 to 20 minutes for heating before irradiation of the active energy ray, 0.2 to 10 minutes for heating simultaneously with irradiation of the active energy ray, or 1 to 60 minutes for heating after irradiation of the active energy ray.

(Step (III))

As shown in FIG. 2, the first optical article 30 consisting of the uneven resin layer 34 and the substrate 20 for an optical article is released from the mold 10 to obtain the first optical article 30 of the invention having an uneven surface structure which consists of plural recesses 36.

(Replica Mold)

By using the first optical article 30 as a replica mold, it is also possible to obtain the second optical article having an uneven resin layer, which is transferred with the uneven structure of the replica mold on the surface of a substrate for an optical article.

The method for manufacturing an optical article having an uneven surface structure of the invention using a replica mold is a method including the following steps I') to (III').
(I') placing an active energy ray curable resin composition between a replica mold having an uneven surface structure and a substrate for an optical article,
(II') forming, on a surface of the substrate for an optical article, an uneven resin layer transferred with the uneven structure of the replica mold by irradiating the active energy ray curable resin composition with active energy ray to cure the active energy ray curable resin composition, and
(III') releasing the optical article having the uneven resin layer and the substrate for an optical article from the replica mold.

(Step (I'))

Figure 3:
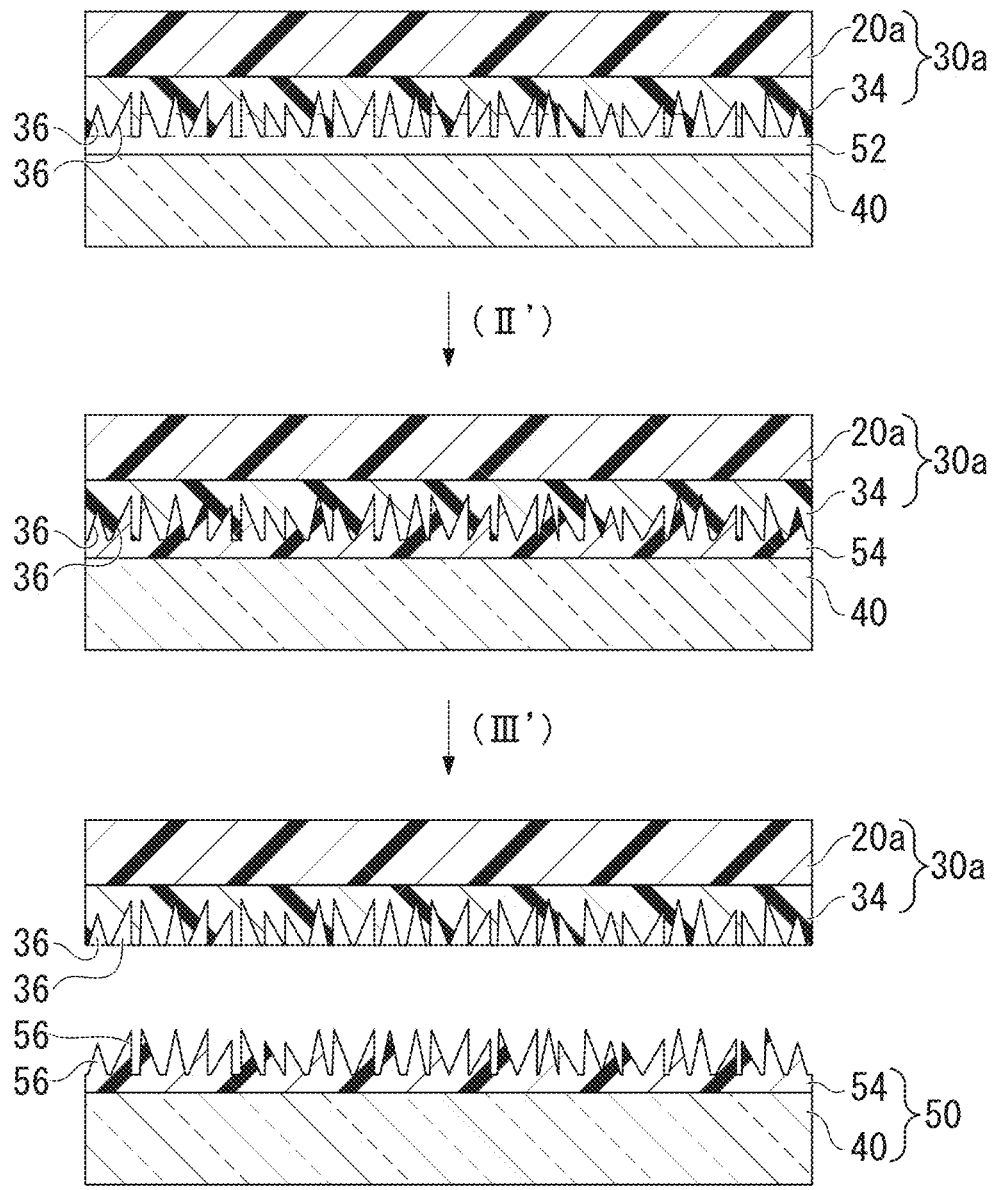
FIG. 3 is a cross-sectional view illustrating another example of the process for manufacturing the optical article having an uneven surface structure according to the invention.

As shown in FIG. 3, the active energy ray curable resin composition 52 is placed between the surface on the side having the uneven structure of the replica mold 30a (the first optical article 30), which has the uneven resin layer 34 having an uneven surface structure consisting of plural recesses 36 formed on a surface of the substrate 20a for a replica mold (substrate 20 for an optical article), and the surface of the substrate 40 for an optical article.

As for the substrate 40 for an optical article and the active energy ray curable resin composition 52, those that are the same as the substrate 20 for an optical article and the active energy ray curable resin composition 32 described above can be mentioned.

Examples of the shape of the replica mold 30a include a film shape, a plate shape, a shape obtained by processing a film shape or a plate shape into a tubular shape or an endless belt shape, and a roll shape.

Surface of the replica mold 30a is preferably treated with a releasing agent.

(Step (II'))

As shown in FIG. 3, by irradiating the active energy ray curable resin composition 52 with active energy ray to cure the active energy ray curable resin composition 52, the uneven resin layer 54 transferred with the uneven structure of the replica mold 30a is formed on a surface of the substrate 40 for an optical article.

The active energy ray may be irradiated from the side of the replica mold 30a, from the side of the substrate 40 for an optical article, or from both sides.

Curing of the active energy ray curable resin composition 52 can be carried out in the same manner as the step (II) described above.

(Step (III'))

As shown in FIG. 3, by releasing the second optical article 50 consisting of the uneven resin layer 54 and the substrate 40 for an optical article from the replica mold 30a, the second optical article 50 of the invention having an uneven surface structure, which consists of plural protrusions 56, is obtained.

(Working Effect)

According to the method for manufacturing an optical article having an uneven surface structure of the invention that is explained above, an uneven resin layer transferred with an uneven structure is formed on a surface of a substrate for an optical article using the mold of the invention (or a replica mold transferred with the uneven structure of the mold of the invention on a substrate surface of a replica mold), and thus an optical article having an uneven surface structure, which can efficiently diffract or diffuse incident light and has little angle-dependent variation in hue of emitted light, can be manufactured with an enlarged size and also with high productivity.

(Other Embodiments)

Meanwhile, the method for manufacturing an optical article having an uneven surface structure of the invention is not limited to the manufacturing method described in the illustrated example. For example, an adhesive layer may be formed between the substrate 20 for an optical article (or the substrate 40 for an optical article) and the uneven resin layer 34 (or the uneven resin layer 54).

<Optical Article Having Uneven Surface Structure>

(First Optical Article)

The first optical article 30 is manufactured by the manufacturing method of the invention. The first optical article 30 is a laminate having the substrate 20 for an optical article and the uneven resin layer 34 formed on a surface of the substrate 20 for an optical article.

The uneven resin layer 34 is a layer consisting of a cured product of the active energy ray curable resin composition 32, and it has an uneven structure consisting of plural recesses 36, that are formed by transferring the protrusions 12 of the mold 10, on its surface.

Examples of a use of the first optical article 30 include an optical film for performing light diffraction or diffusion, a transparent substrate for a surface light emitter, a light extraction member of a surface light emitter, a protective plate for a solar cell, a transparent substrate for a thin film solar cell, and a replica mold.

(Second Optical Article)

The second optical article 50 is manufactured by the manufacturing method of the invention. The second optical article 50 is a laminate having the substrate 40 for an optical article and the uneven resin layer 54 formed on a surface of the substrate 40 for an optical article.

The uneven resin layer 54 is a layer consisting of a cured product of the active energy ray curable resin composition 52, and it has an uneven structure consisting of plural protrusions 56, that are formed by transferring the recesses 36 of the replica mold 30a (the first optical article 30), on its surface.

Examples of a use of the second optical article 50 include an optical film for performing light diffraction or diffusion, a transparent substrate for a surface light emitter, a light extraction member of a surface light emitter, a protective plate for a solar cell, a transparent substrate for a thin film solar cell, and a replica mold.

(First and Second Optical Article)

In the uneven structure of the first optical article 30 and the second optical article 50 (hereinbelow, both are simply described as the "optical article"), average spacing Sm between the uneven protrusions is preferably 200 to 100,000 nm, more preferably 250 to 50,000 nm, and even more preferably 300 to 10,000 nm. When the average spacing Sm between the uneven protrusions is 200 nm or more, a structure for having a high anti-reflection effect is not obtained, and thus a decrease in light diffusion effect can be suppressed. When the average spacing Sm between the uneven protrusions is 100,000 nm or less, an angle varying activity of light is not lowered so that the incident light can be efficiently diffracted or diffused.

The mean spacing S between local mountain tops in an uneven structure of the optical article is preferably 150 to 80,000 nm, more preferably 200 to 20,000 nm, and more preferably 250 to 5,000 nm. When the mean spacing S between local mountain tops is 150 nm or more, a structure for having a high anti-reflection effect is not obtained, and thus a decrease in light diffusion effect can be suppressed. When the mean spacing S between local mountain tops is 80,000 nm or less, an angle varying activity of light is not lowered so that the incident light can be efficiently diffracted or diffused.

Arithmetic mean roughness Ra of a surface on the side having the uneven structure of the uneven resin layer is preferably 5 to 1,000 nm, and more preferably 10 to 500 nm, from the viewpoint of sufficiently increasing the light extraction efficiency of the surface light emitter described below.

The maximum height Ry of a surface on the side having the uneven structure of the uneven resin layer is preferably 10 to 10,000 nm, and more preferably 50 to 5,000 nm, from the viewpoint of sufficiently increasing the light extraction efficiency of the surface light emitter described below.

The 10-point average height Rz of a surface on the side having the uneven structure of the uneven resin layer is preferably 5 to 5,000 nm, and more preferably 25 to 2,500 nm, from the viewpoint of sufficiently increasing the light extraction efficiency of the surface light emitter described below.

The root mean square roughness RMS of a surface on the side having the uneven structure of the uneven resin layer is preferably 5 to 1,000 nm, and more preferably 10 to 500 nm, from the viewpoint of sufficiently increasing the light extraction efficiency of the surface light emitter described below.

(Working Effect)

According to the optical article having an uneven surface structure of the invention that is explained above, because an uneven structure that is formed by transferring the uneven structure of the mold or the replica mold of the invention is present on the surface, incident light can be efficiently diffracted or diffused and there is little angle-dependent variation in hue of emitted light.

(Other Embodiments)

Meanwhile, the optical article having an uneven surface structure of the invention is not limited to the illustrated example. For example, an adhesive layer may be included between the substrate 20 for an optical article (or the substrate 40 for an optical article) and the uneven resin layer 34 (or the uneven resin layer 54).

The optical article having an uneven surface structure of the invention is not limited those obtained by the manufacturing method of the invention. For example, it may be an optical article having an uneven surface structure, in which an average inclination angle of an uneven surface is 20 to 80 degrees. When the average inclination angle is 20 degrees or higher, incident light can be efficiently diffracted or diffused. Further, when the average inclination angle is 80 degrees or lower, releasability of the mold is improved. The average inclination angle of an uneven surface is preferably 25 to 75 degrees, and more preferably 30 to 70 degrees.

The optical mold preferably has a diffusion factor of 5 to 80%. When the diffusion factor is 5% or more, the uneven structure becomes irregular, and incident light can be more efficiently diffracted or diffused. Further, when the diffusion factor is 80% or less, an angle varying activity of light is not excessively high so that a decrease in the light extraction efficiency in a surface light emitter described below can be suppressed. The diffusion factor is more preferably 7 to 75%, and even more preferably 10 to 70%.

<Transparent Substrate for a Surface Light Emitter>

The transparent substrate for a surface light emitter of the invention may consist of an optical article having an uneven surface structure of the invention or an optical article having an uneven surface structure of the invention with a high refractive index layer formed on a surface of an uneven resin layer. The substrate for an optical article is a transparent article, and a light extraction part consisting of an uneven resin layer or a light extraction part consisting of an uneven resin layer and a high refractive index layer is present on a surface of the transparent substrate.

Figure 4:
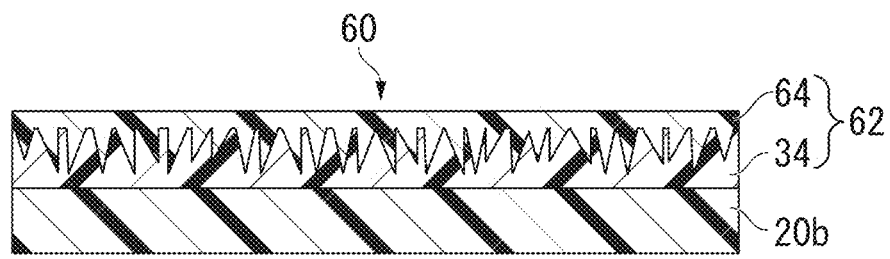
FIG. 4 is a cross-sectional view illustrating an example of the transparent substrate for a surface light emitter according to the invention.
Figure 5:
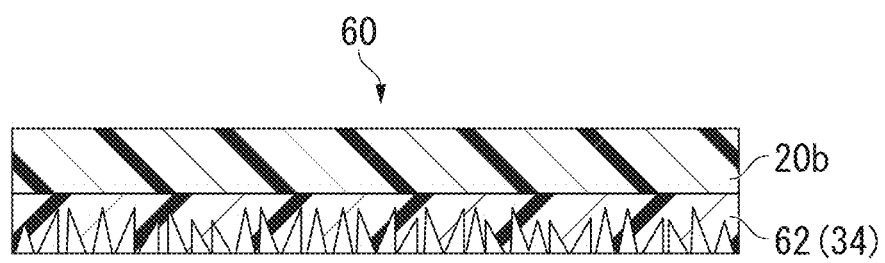
FIG. 5 is a cross-sectional view illustrating another example of the transparent substrate for a surface light emitter according to the invention.

FIG. 4 and FIG. 5 are cross-sectional views illustrating an example of the transparent substrate for a surface light emitter according to the present invention, in which the first optical article 30 is used. The transparent substrate 60 for a surface light emitter has the transparent substrate 20b (the substrate 20 for an optical article) and the light extraction part 62 formed on a surface of the transparent substrate 20b.

The light extraction part 62 in the transparent substrate 60 for a surface light emitter of FIG. 4 consists of the uneven resin layer 34 formed on a surface of the transparent substrate 20b and the high refractive index layer 64 formed on a surface of the uneven resin layer 34 for flattening the uneven structure of the uneven resin layer 34.

The light extraction part 62 in the transparent substrate 60 for a surface light emitter of FIG. 5 consists only of the uneven resin layer 34 formed on a surface of the transparent substrate 20b.

Figure 6:
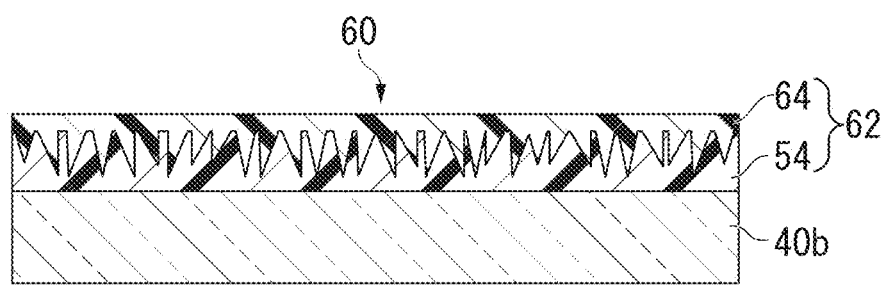
FIG. 6 is a cross-sectional view illustrating another example of the transparent substrate for a surface light emitter according to the invention.
Figure 7:
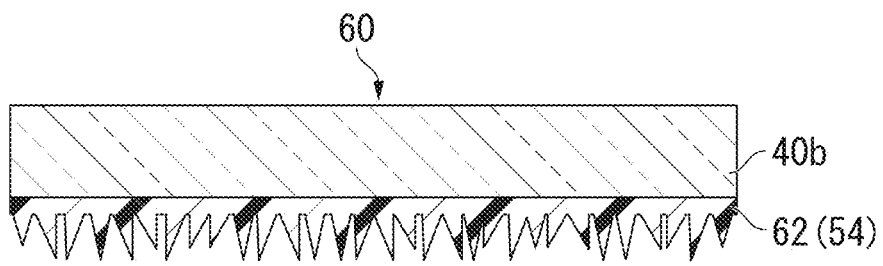
FIG. 7 is a cross-sectional view illustrating another example of the transparent substrate for a surface light emitter according to the invention.

FIG. 6 and FIG. 7 are cross-sectional views illustrating an example of the transparent substrate for a surface light emitter according to the invention, in which the second optical article 50 is used. The transparent substrate 60 for a surface light emitter has the transparent substrate 40b (the substrate 40 for an optical article) and the light extraction part 62 formed on a surface of the transparent substrate 40b.

The light extraction part 62 in the transparent substrate 60 for a surface light emitter of FIG. 6 consists of the uneven resin layer 54 formed on a surface of the transparent substrate 40b and the high refractive index layer 64 formed on a surface of the uneven resin layer 54 for flattening the uneven structure of the uneven resin layer 54.

The light extraction part 62 in the transparent substrate 60 for a surface light emitter of FIG. 7 consists only of the uneven resin layer 54 formed on a surface of the transparent substrate 40b.

(High Refractive Index Layer)

The high refractive index layer 64 is a layer consisting of a material with a refractive index that is higher than the refractive index of the uneven resin layer 34 (or the uneven resin layer 54) but lower than the refractive index of the transparent electrode 82 described below. When the uneven resin layer 34 (or the uneven resin layer 54) consists of a cured product of an active energy ray curable resin composition which contains a monomer or an oligomer having a (meth)acryloyloxy group, the refractive index is 1.49 or so, and when the transparent electrode 82 consists of ITO, the refractive index is 2.12 or so, and therefore the refractive index of the material for the high refractive index layer 64 is preferably 1.5 to 2.1, and more preferably 1.6 to 2.0.

Examples of the material of the high refractive index include bis(4-methacryloylthiophenyl)sulfide, vinyl naphthalene, vinyl phenyl sulfide, 4-methacryloxyphenyl-4'-methoxyphenyl thioether, a fluorene-based epoxy resin (for example, epoxy resin having bisarylfluorene as a basic skeleton (manufactured by Nagase & Co., Ltd.)), and a fluorene-based acrylic resin (for example, OGSOL (manufactured by Osaka Gas Chemicals Co., Ltd.)).

(Working Effect)

According to the transparent substrate for a surface light emitter of the invention described above, because incident light can be efficiently diffracted or diffused and there is an uneven resin layer having little angle-dependent variation in hue of emitted light, a surface light emitter with high light extraction efficiency and little angle-dependent variation in hue of emitted light can be obtained.

Further, because the shape, spacing, or the like of uneven protrusions constituting the uneven resin layer is irregular, deflection of the angle and wavelength of the light that is effectively diffracted or diffused in accordance with the uneven structure is small. For such reasons, a surface light emitter which has high light extraction efficiency and can irradiate evenly a large range compared to the surface light emitter of Patent Literature 1 can be obtained.

The following working effect is exhibited when there is a high refractive index layer.

When the mean spacing Sm between uneven protrusions is 200 nm or less in the uneven resin layer, a difference in refractive index at an interface between the high refractive index layer and the uneven resin layer and at an interface between the high refractive index layer and the transparent electrode becomes small so that light reflection at each interface can be suppressed. As a result, the effect of lowering Fresnel reflection is enhanced, and thus the light extraction efficiency is further improved. When the mean spacing Sm between uneven protrusions is 200 nm to 1 μm in the uneven resin layer, light trapped in the transparent electrode or an organic semiconductor layer can be extracted to the outside by a diffraction effect based on the uneven structure of the high refractive index layer. When the mean spacing Sm between uneven protrusions is 1 to 50 μm in the uneven resin layer, light trapped in the transparent electrode or an organic semiconductor layer can be extracted to the outside by diffusion based on the uneven structure of the high refractive index layer.

The high refractive index layer also plays a role of filling recesses of the uneven resin layer and flattening the surface of a light extraction part. Once the surface of a light extraction part is flattened, each layer of the light emission part described below can be formed evenly and easily.

(Other Embodiments)

Meanwhile, the transparent substrate for a surface light emitter of the invention is not limited to the illustrated example.

For example, an adhesive layer may be formed between the transparent substrate 20b (or the transparent substrate 40b) and the uneven resin layer 34 (or the uneven resin layer 54).

Figure 12:
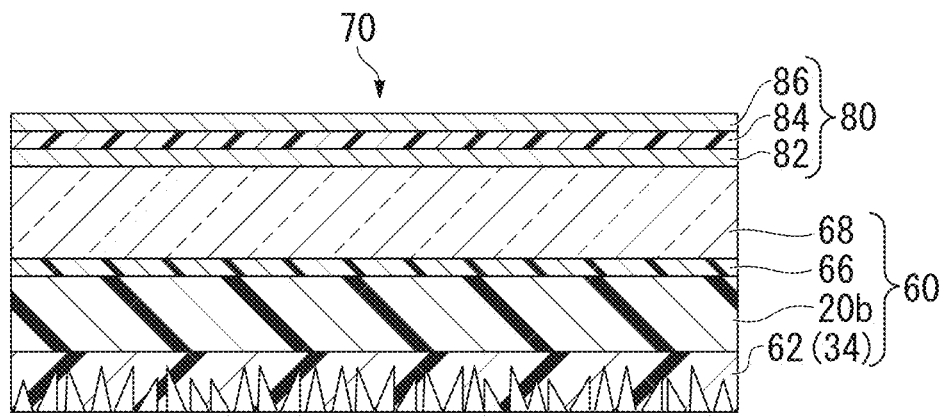
FIG. 12 is a cross-sectional view illustrating another example of the surface light emitter according to the invention.

It is also possible that another transparent substrate is sticked to a surface of the transparent substrate 20b (or the transparent substrate 40b) side of the transparent substrate 60 for a surface light emitter via an adhesive layer or the like (see FIG. 12).

Figure 13:
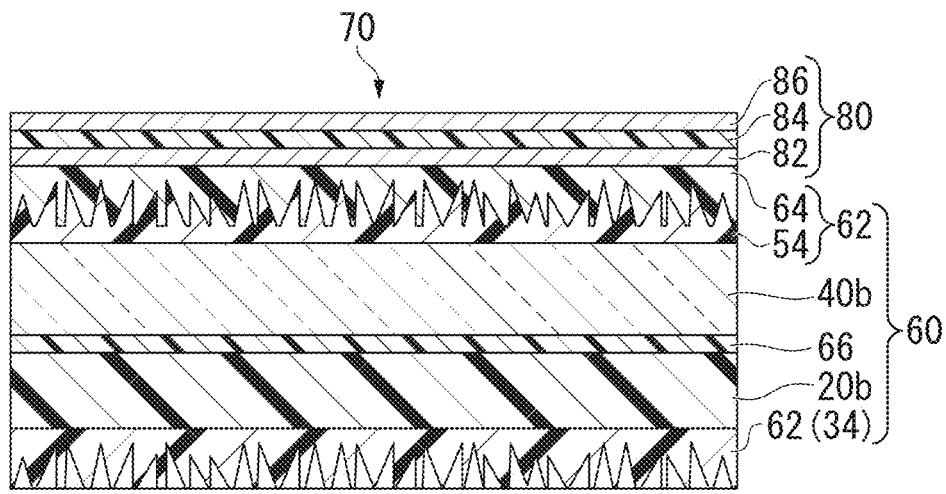
FIG. 13 is a cross-sectional view illustrating another example of the surface light emitter according to the invention.

It is also possible that two pieces of the transparent substrate 60 for a surface light emitter are sticked via an adhesive layer or the like so as to face the surface of the transparent substrate 20b (or the transparent substrate 40b) side (see FIG. 13).

It is also possible that another light extraction member (such as a micro lens array sheet, a prism sheet, and a trapezoidal tent sheet) is sticked on a surface of the transparent substrate 20b (or the transparent substrate 40b) side of the transparent substrate 60 for a surface light emitter via an adhesive layer or the like (see Examples 9 and 10).

<Surface Light Emitter>

The surface light emitter of the invention includes the transparent substrate for a surface light emitter, a transparent electrode formed on a surface of the transparent substrate for a surface light emitter, a rear surface electrode that is formed to be spaced from the transparent electrode, and a light emitting layer that is formed between the transparent electrode and the rear surface electrode.

FIGS. 8 to 13 are cross-sectional views illustrating an example of the surface light emitter according to the invention. The organic EL device 70 (surface light emitter) is equipped with the transparent substrate 60 for a surface light emitter; the light emission part 80 formed on the transparent substrate 60 for a surface light emitter, which has the transparent electrode 82, the organic semiconductor layer 84 having a light emitting layer (not illustrated), and the rear surface electrode 86 in this order from the transparent substrate 60 for a surface light emitter; and a sealing part for sealing the light emission part 80 (not illustrated).

Figure 8:
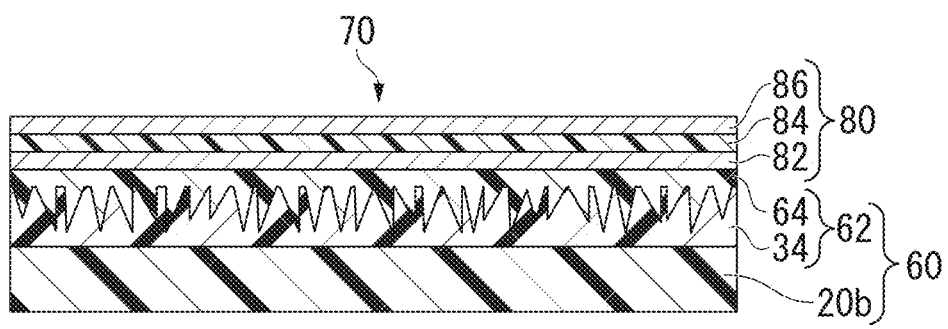
FIG. 8 is a cross-sectional view illustrating an example of the surface light emitter according to the invention.

In the organic EL device 70 of FIG. 8, the first optical article 30 is used and the light emission part 80 is formed on a surface of the high refractive index layer 64 of the transparent substrate 60 for a surface light emitter which has the high refractive index layer 64.

Figure 9:
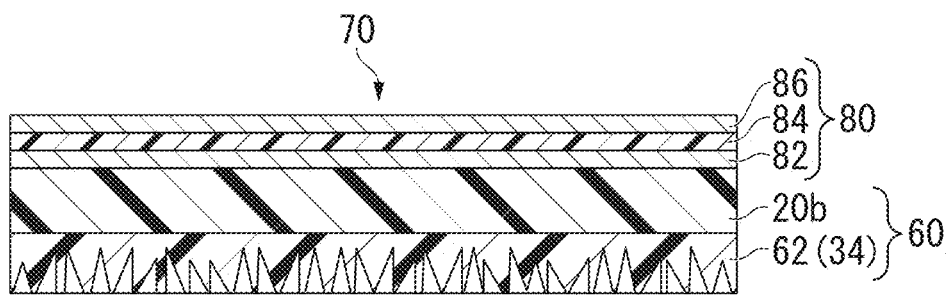
FIG. 9 is a cross-sectional view illustrating another example of the surface light emitter according to the invention.

In the organic EL device 70 of FIG. 9, the first optical article 30 is used and the light emission part 80 is formed on a surface of the transparent substrate 20b of the transparent substrate 60 for a surface light emitter which does not have the high refractive index layer 64.

Figure 10:
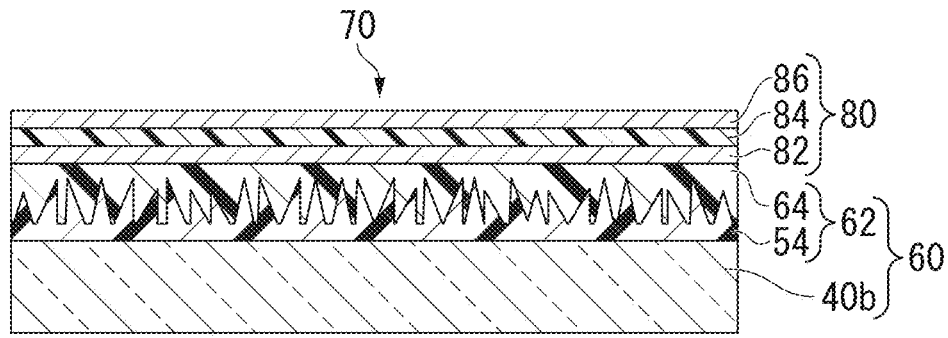
FIG. 10 is a cross-sectional view illustrating another example of the surface light emitter according to the invention.

In the organic EL device 70 of FIG. 10, the second optical article 50 is used and the light emission part 80 is formed on a surface of the high refractive index layer 64 of the transparent substrate 60 for a surface light emitter which has the high refractive index layer 64.

Figure 11:
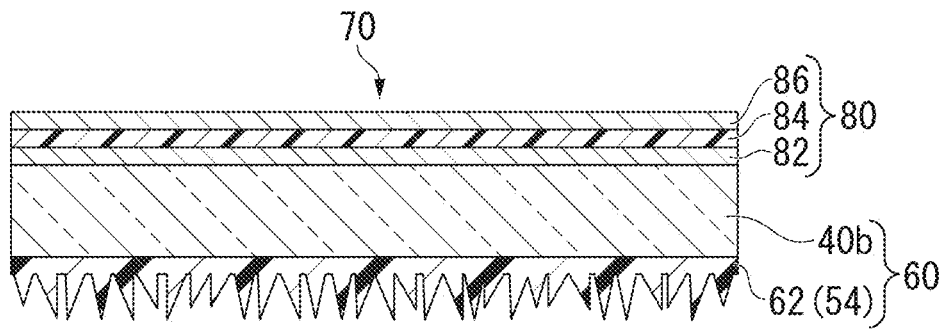
FIG. 11 is a cross-sectional view illustrating another example of the surface light emitter according to the invention.

In the organic EL device 70 of FIG. 11, the second optical article 50 is used and the light emission part 80 is formed on a surface of the transparent substrate 40b of the transparent substrate 60 for a surface light emitter which does not have the high refractive index layer 64.

In the organic EL device 70 of FIG. 12, the first optical article 30 is used and the light emission part 80 is formed on a surface of another transparent substrate 68 of the transparent substrate 60 for a surface light emitter in which another transparent substrate 68 is sticked to surface of the transparent substrate 20b via the adhesive layer 66.

In the organic EL device 70 of FIG. 13, the light emission part 80 is formed on a surface of the high refractive index layer 64 of the transparent substrate 60 for a surface light emitter in which a transparent substrate for a surface light emitter that uses the first optical article 30 but not having the high refractive index layer 64 is sticked to a transparent substrate for a surface light emitter that uses the second optical article 50 and having the high refractive index layer 64 via the adhesive layer 66 such that a surface of the transparent substrate 20b and a surface of the transparent substrate 40b face each other.

(Transparent Electrode)

As for the material of the transparent electrode 82, a metal oxide having conductivity, a metal capable of forming a thin metal film having light transmitting property, and an organic polymer having conductivity.

Examples of the metal oxide having conductivity include such as indium oxide, zinc oxide, tin oxide, indium tin oxide (ITO), and indium zinc oxide (IZO).

Examples of the metal capable of forming a thin metal film having light transmitting property include such as gold, platinum, silver, copper, and aluminum.

Examples of the organic polymer having conductivity include such as polyaniline, a derivative thereof, polythiophene, PEDOT-PSS (poly(3,4-ethylenedioxythiophene): poly(styrenesulfonate)), and a derivative thereof.

The transparent electrode 82 may be formed in a single layer or two or more layers.

From the viewpoint of compatibility between a light transmitting property and conductivity, the thickness of the transparent electrode 82 is preferably 10 to 1,000 nm, and more preferably 50 to 500 nm.

The transparent electrode 82 may be either a positive electrode or a negative electrode. The transparent electrode 82 is generally considered as a positive electrode.

(Organic Semiconductor Layer)

The organic semiconductor layer 84 has at least a light emitting layer (not illustrated). The organic semiconductor layer 84 may have another functional layer between the light emitting layer and the transparent electrode 82 or the rear surface electrode 86. Examples of another functional layer formed between the transparent electrode 82 and the light emitting layer include a hole injection layer and a hole transport layer in this order from the transparent electrode 82 side. Examples of other functional layer formed between the light emitting layer and the rear surface electrode 86 include a hole blocking layer, an electron transport layer, and an electron injection layer in this order from the light emitting layer side.

The light emitting layer is a layer containing a light emitting material of an organic compound.

Examples of the light emitting material of the organic compound include a material (such as CBP: Ir(ppy)$_3$) obtained by doping a carbazole derivative (such as 4,4'-N, N'-dicarbazole-diphenyl (hereinbelow, referred to as CBP) that is a host compound of a phosphorescent compound with an iridium complex (tris(2-phenyl pyridine) iridium (hereinbelow, referred to as Ir(ppy)$_3$)); metal complexes (tris(8-hydroxyquinoline) aluminum (hereinbelow, referred to as Alq$_3$)) of 8-hydroxyquinoline or a derivative thereof; and other light emitting materials that are known in the related art.

The light emitting layer may contain a hole transport material, an electron transport material, and the like in addition to the light emitting material.

The thickness of the light emitting layer is preferably 1 to 100 nm, and more preferably 10 to 50 nm.

The light emitting layer may be formed in a single layer or two or more layers. For example, in a case of using the organic EL device 70 as a white organic EL lighting equipment, the light emitting layer may have a laminated structure including a blue light emitting layer, a green light emitting layer, and a red light emitting layer.

The hole injection layer is a layer containing a hole injection material.

Examples of the hole injection material include such as copper phthalocyanine (hereinbelow, referred to as CuPc), vanadium oxide, an organic polymer having conductivity, and other organic hole injection materials that are known in the related art.

The thickness of the hole injection layer is preferably 1 to 100 nm, and more preferably 10 to 50 nm.

The hole transport layer is a layer containing a hole transporting material.

Examples of the hole transporting material include triphenyl diamines (such as 4,4'-bis(m-tolyl phenyl amino) biphenyl (hereinbelow, referred to as TPD)); and other hole transporting materials that are known in the related art.

The thickness of the hole transport layer is preferably 1 to 100 nm, and more preferably 10 to 50 nm.

The hole blocking layer is a layer containing a hole blocking material.

Examples of the hole blocking material include 2,9-dimethyl-4,7-diphenyl-1,10-phenanthroline (hereinbelow, referred to as BCP) and the like; and other hole blocking materials that are known in the related art.

The thickness of the hole blocking layer is preferably 1 to 100 nm, and more preferably 5 to 50 nm.

The electron transport layer is a layer containing an electron transporting material.

Examples of the electron transporting material include a metal complex (such as Alq$_3$) of 8-hydroxyquinoline or a derivative thereof, an oxadiazole derivative, and other electron transporting materials that are known in the related art.

The thickness of the electron transport layer is preferably 1 to 100 nm, and more preferably 10 to 50 nm.

The electron injection layer is a layer containing an electron injection material.

Examples of the electron injection material include an alkali metal compound (such as lithium fluoride), an alkaline earth metal compound (such as magnesium fluoride), a metal (such as strontium), and other electron injection materials that are known in the related art.

The thickness of the electron injection layer is preferably 1 to 100 nm, and more preferably 10 to 50 nm.
(Rear Surface Electrode)

Examples of a material of the rear surface electrode 86 include lithium, sodium, potassium, rubidium, cesium, beryllium, magnesium, calcium, strontium, barium, aluminum, scandium, vanadium, zinc, yttrium, indium, cerium, samarium, europium, terbium, and ytterbium. Further examples include alloys obtained by combining two or more of them, metal salts such as fluorides of them, alloys of one or more of them and one or more selected from a group consisting of gold, silver, platinum, copper, manganese, titanium, cobalt, nickel, tungsten, and tin. Specific examples of the alloys include a magnesium-silver alloy, a magnesium-indium alloy, a magnesium-aluminum alloy, an indium-silver alloy, a lithium-aluminum alloy, a lithium-magnesium alloy, a lithium-indium alloy, and a calcium-aluminum alloy, and the like The rear surface electrode 86 may be formed in a single layer or two or more layers.

From the viewpoints of conductivity and durability, the thickness of the rear surface electrode 86 is preferably 5 to 1,000 nm, and more preferably 10 to 300 nm.

The rear surface electrode 86 may be either a positive electrode or a negative electrode. The rear surface electrode 86 is generally considered as a negative electrode.
(Method for Manufacturing Surface Light Emitter)

The organic EL device 70 can be manufactured by a method including the following steps (α) to (δ), for example.

(α) A step of forming the transparent electrode 82 on a surface of the transparent substrate 60 for a surface light emitter.

(β) A step of forming the organic semiconductor layer 84 containing a light emitting layer (not illustrated) on a surface of the transparent electrode 82.

(γ) A step of forming the rear surface electrode 86 on a surface of the organic semiconductor layer 84.

(δ) A step of sealing the light emission part 80 with a sealing part (not illustrated).
(Step (α))

By depositing a material of the electrode through a mask having holes with a pre-determined pattern, the transparent electrode 82 is formed on a surface of transparent substrate 60 for a surface light emitter.

Examples of a deposition method include physical deposition methods such as a vacuum deposition method, a sputtering method, or an ion plating method. From the viewpoint of easiness of forming the transparent electrode 82, the sputtering method is preferable.

The deposition rate is, from the viewpoint of easiness of forming the transparent electrode 82, preferably 10 nm/second or lower, and more preferably 5 nm/second or lower. From the viewpoint of the productivity, the deposition rate is preferably 0.001 nm/second or more and more preferably 0.01 nm/second or more.

In order to increase the adhesiveness between the transparent substrate 60 for a surface light emitter and the transparent electrode 82, the surface of the transparent substrate 60 for a surface light emitter may be subjected to an UV ozone treatment, a plasma treatment, a corona treatment or an excimer treatment before the deposition.

A heating treatment, a vacuum treatment, a heating and vacuum treatment, or the like may be performed for the transparent substrate 60 for a surface light emitter before the deposition so as to remove a dissolved gas and an unreacted monomer that are contained in the transparent substrate 60 for a surface light emitter.

(Step (β))

By depositing, on a surface of the transparent electrode 82, a material for each layer constituting the organic semiconductor layer 84 through a mask having holes with a pre-determined pattern in order, the organic semiconductor layer 84 is formed.

Examples of a deposition method include physical deposition methods such as a vacuum deposition method, a sputtering method, or an ion plating method. When the material is an organic material, the vacuum deposition method is preferable.

The deposition rate is, from the viewpoint of easiness of forming each layer, preferably 10 nm/second or lower, and more preferably 5 nm/second or lower. From the viewpoint of the productivity, the deposition rate is preferably 0.1 nm/second or more and more preferably 0.5 nm/second or more.

In order to increase the adhesiveness between the transparent electrode 82 and the organic semiconductor layer 84, the surface of the transparent electrode 82 may be subjected to an UV ozone treatment, a plasma treatment, a corona treatment or an excimer lamp treatment before the deposition.

(Step (γ))

By depositing a material of the electrode through a mask having holes with a pre-determined pattern, the rear surface electrode 86 is formed on the organic semiconductor layer 84.

Examples of a deposition method include physical deposition methods such as a vacuum deposition method, a sputtering method, or an ion plating method. From the viewpoint of not giving damage to the organic semiconductor layer 84 as a lower layer, the vacuum deposition method is preferable.

The deposition rate is, from the viewpoint of not giving damage to the organic semiconductor layer 84, preferably 10 nm/second or lower, and more preferably 5 nm/second or lower. From the viewpoint of easy formation of continuous thin metal film and the productivity, the deposition rate is preferably 0.5 nm/second or more and more preferably 1.0 nm/second or more.

(Step (δ))

When the sealing part consists of a dig-in glass, the sealing part is formed by covering the dig-in glass such that the light emission part 80 is accommodated in a recess part of dig-in glass and attaching an opening cross section of the dig-in glass to the transparent substrate 60 for a surface light emitter using adhesives.

When the sealing part consists of a barrier layer, the sealing part is formed by depositing a material for a barrier layer or the like.

Examples of the method for forming a barrier layer include a vacuum deposition method, a sputtering method, a reactive sputtering method, an MBE (molecular beam epitaxy) method, a cluster ion beam method, an ion plating method, a plasma polymerization (high frequency excited ion plating method) method, a plasma CVD method, a laser CVD method, a thermal CVD method, a gas source CVD method, and a coating method.

Examples of the material for a barrier layer include a metal, a metal oxide, a metal nitride, a metal acid nitride, a metal fluoride, and a resin.

(Working Effect)

Since the organic EL device 70 of the invention explained above is equipped with the light extraction part 62 which has the uneven resin layer 34 (or the uneven resin layer 54), light reflection on an interface between the light extraction part 62 and the light emission part 80 or an interface between the light extraction part 62 and outside air is suppressed so that the light extraction efficiency is increased. Further, there is little angle-dependent variation in hue of emitted light.

Further, because the pitch or height of the recesses 36 (or protrusions 56) of the uneven resin layer 34 (or the uneven resin layer 54) is irregular, deflection of the angle and wavelength of the light that is effectively diffracted or diffused in accordance with the uneven structure is small. For such reasons, the light extraction efficiency is higher than the surface light emitter of Patent Literature 1, and thus irradiation can be made evenly over a large range.

(Other Embodiments)

Meanwhile, the organic EL device of the invention is not limited to the organic EL device 70 of an illustrated example. For example, it may have an adhesive layer between the transparent substrate 20b (or the transparent substrate 40b) and the uneven resin layer 34 (or the uneven resin layer 54).

It is also possible that other light extraction member (e.g., a micro lens array sheet, a trapezoidal tent sheet, and a prism sheet) is sticked on a surface of the transparent substrate 20b (or the transparent substrate 40b) of the transparent substrate 60 for a surface light emitter via an adhesive layer (see Examples 9 and 10).

EXAMPLES

Hereinbelow, examples of the invention are described in detail, but the invention is not limited to them.

(Average Inclination Angle)

A sample (mold or optical article) was embedded in a thermocurable epoxy resin and cross-section of the sample was subjected to mechanical polishing.

The mold was subjected to cross-section processing with an acceleration voltage of 6 kV and a processing temperature of −175° C. by an ion milling apparatus (Ilion⁺ 693.A manufactured by Gatan). The optical article was coated with Os to 20 to 30 nm, and then subjected to cross-section processing in the same manner as the mold.

By using a scanning electron microscope (S-4300SE/N, manufactured by Hitachi High-Technologies Corporation), a photographic image of the processed cross-section of the sample was taken.

From a cross-sectional photographic image of the sample taken by a scanning electron microscope, a photographic image of the uneven structure was collected for the length L (10 μm), which is a standard length in direction x perpendicular to height direction y of the uneven structure. The collected photographic image of the uneven structure was digitalized using software for photographic image (free software, "graph scanner") and the ridge line of the uneven structure was transformed into a xy coordinate. From the obtained coordination data of the ridge line, the average inclination angle $\theta a$ was obtained by the method described above.

(Mean Spacing Between Uneven Protrusions)

Mean spacing Sm between uneven protrusions was obtained from the coordination data of the ridge line by the method described above.

(Mean Spacing Between Local Mountain Tops)

Mean spacing S between local mountain tops was obtained from the coordination data of the ridge line by the method described above.

(Surface Roughness)

Arithmetic mean roughness Ra, maximum height Ry, 10-point average height Rz, and root mean square roughness RMS were obtained for any three points in a subject measurement area of 50 μm×50 μm by an atomic force microscopy (VN-8010, manufactured by Keyence Corporation; cantilever DFM/SS-Mode) according to JIS B0601-1994, and the average value was obtained.

(Total Reflectance)

By using a haze transmittance meter (RT-100, manufactured by Murakami Color Research Laboratory Co., Ltd.), a total reflectance Rt with the light source C was measured according to JIS K 7105.

(Martens Hardness)

Measurement of the Martens hardness was performed using Fischerscope HM2000. The indenter used for the measurement was a diamond pyramid having a facing angle of 135 degrees. Under an environment having a temperature of 23° C. and a relative humidity of 50%, the indenter was pressed against the uneven resin layer up to 1 mN for 20 seconds until $dF/dt^2$ (F: load and t: elapsed time) becomes constant and then subjected to creeping for 5 seconds. After that, under a measurement condition in which the load is removed under the same condition as the load application, the load was divided by surface area of the indenter which makes an invasion over the zero contact point, and a Martens hardness was obtained accordingly.

(Diffusion Factor)

By using He—Ne laser (05-LPL-911-065 manufactured by CVI Melles Griot), laser light was applied to an optical article in the height direction of the uneven structure. By using a conoscope (EZ-Contrast160R, EZ-Com software manufactured by ELDIM), distribution of intensity $I_\theta$ of transmitted diffusion light which is emitted after transmission through the optical article was measured. From the intensity when exit angle $\theta$ is 5 degrees, 20 degrees, and 70 degrees, the diffusion factor D was obtained by the equation described above.

(Transfer Characteristics)

Surface of the mold after transfer was observed and the evaluation was made based on the following criteria.

◯: Cured product of the active energy ray curable composition does not remain on a surface of the mold.

Δ: Part of the cured product of the active energy ray curable composition remains on a surface of the mold.

X: Most of the cured product of the active energy ray curable composition remains on a surface of the mold.

(Observation of Surface and Cross-Section)

By using a scanning electron microscope (S-4300SE/N, manufactured by Hitachi High-Technologies Corporation), the surface and cross-section of the mold and uneven resin layer were observed.

(Measurement of Orientation Distribution)

By using an apparatus for measuring orientation luminance distribution (apparatus for measuring EL optical characteristics, manufactured by Otsuka Electronics Co., Ltd.), chrominance (x, y) of emitted light when an organic EL device is applied with a current of 0.5 mA/cm² was measured in a manual measurement mode while it is tilted by a unit of 1 degree in the range of from 0 degree (direction perpendicular to surface of a transparent substrate of an organic EL device) to 70 degrees. The maximum rate of chrominance change (Δx, Δy) was calculated for the range of 0 to 70 degrees.

(Mold (X-1))

As mold (X-1), needle-like nickel alloy plating (manufactured by Ebina Denka Kogyo Co., Ltd., mold substrate: aluminum, 5 cm×5 cm) was prepared.

Figure 14:
FIG. 14 is a scanning electron microscopic image of the surface of the mold (X-1) used in Examples.
Figure 15:
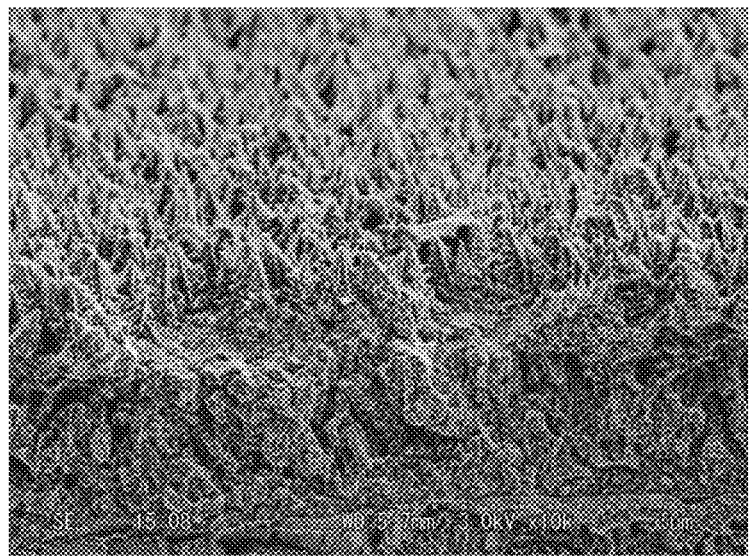
FIG. 15 is a scanning electron microscopic image of the cross-section of the mold (X-1) used in Examples.

The average inclination angle, mean spacing between uneven protrusions, mean spacing between local mountain tops, and surface roughness of the mold (X-1) are shown in Table 1. A scanning electron microscopic image of the surface of the mold (X-1) is shown in FIG. 14. A scanning electron microscopic image of the cross-section of the mold (X-1) is shown in FIG. 15.

The mold (X-1) was subjected to ultrasonic cleaning using pure water.

The releasing agent (OPTOOL DSX, manufactured by Daikin Industries, Ltd.) was diluted with an organic solvent for dilution (DURASURF HD-ZV manufactured by HARVES Co., Ltd.) to prepare a diluted solution in which a concentration of the releasing agent is 0.1% by weight. After impregnating the mold (X-1) in the diluted solution for 10 minutes at room temperature, it was pulled up and dried at room temperature for 24 hours to obtain the mold (X-1) treated with a releasing agent. The total reflectance of the mold (X-1) is shown in Table 1.

(Mold (X-2))

As mold (X-2), needle-like copper alloy plating (manufactured by Ebina Denka Kogyo Co., Ltd., mold substrate: aluminum, 5 cm×5 cm) was prepared.

Figure 16:
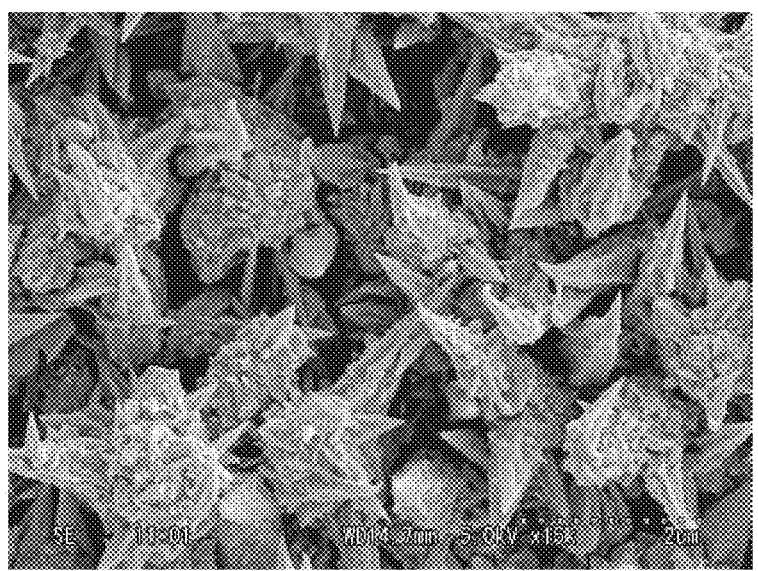
FIG. 16 is a scanning electron microscopic image of the surface of the mold (X-2) used in Examples.
Figure 17:
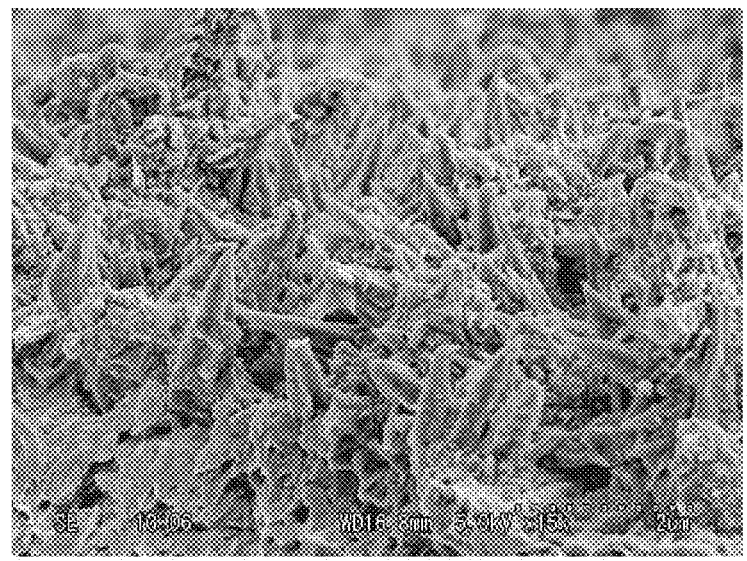
FIG. 17 is a scanning electron microscopic image of the cross-section of the mold (X-2) used in Examples.

The average inclination angle, mean spacing between uneven protrusions, mean spacing between local mountain tops, and surface roughness of the mold (X-2) are shown in Table 1. A scanning electron microscopic image of the surface of the mold (X-2) is shown in FIG. 16. A scanning electron microscopic image of the cross-section of the mold (X-2) is shown in FIG. 17.

The mold (X-2) was treated with a releasing agent in the same manner as the mold (X-1) to obtain the mold (X-2) treated with a releasing agent. The total reflectance of the mold (X-2) is shown in Table 1.

(Mold (X-3))

As mold (X-3), needle-like nickel alloy plating (manufactured by Ebina Denka Kogyo Co., Ltd., mold substrate: oxygen free copper (manufactured by Hakudo Corporation), 5 cm×5 cm) was prepared.

Figure 18:
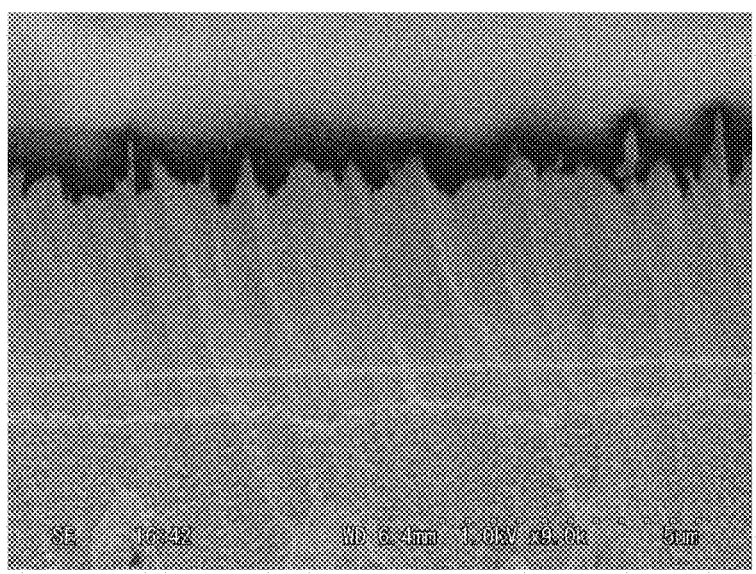
FIG. 18 is a scanning electron microscopic image of the cross-section of the mold (X-3) used in Examples.

The average inclination angle, mean spacing between uneven protrusions, mean spacing between local mountain tops, and surface roughness of the mold (X-3) are shown in Table 1. A scanning electron microscopic image of the cross-section of the mold (X-3) with completed cross-section processing is shown in FIG. 18.

The mold (X-3) was treated with a releasing agent in the same manner as the mold (X-1) to obtain the mold (X-3) treated with a releasing agent. The total reflectance of the mold (X-3) is shown in Table 1.

(Mold (X-4))

By using a blast apparatus (PAM107, manufactured by manufactured by Yokohama Nicchu Co., Ltd.), alumina beads (A400S) were collided against a mirror-surface SUS plate (10 cm×10 cm, thickness of 0.5 mm) at a pitch of 2.5 mm, a supply amount of 30%, a pressure of 0.3 MPa, a velocity of 20 mm/second, and nozzle height of 320 mm to obtain the mold (X-4). The mold (X-4) was cleaned several times with flowing water, and then subjected to ultrasonic cleaning.

Figure 19:
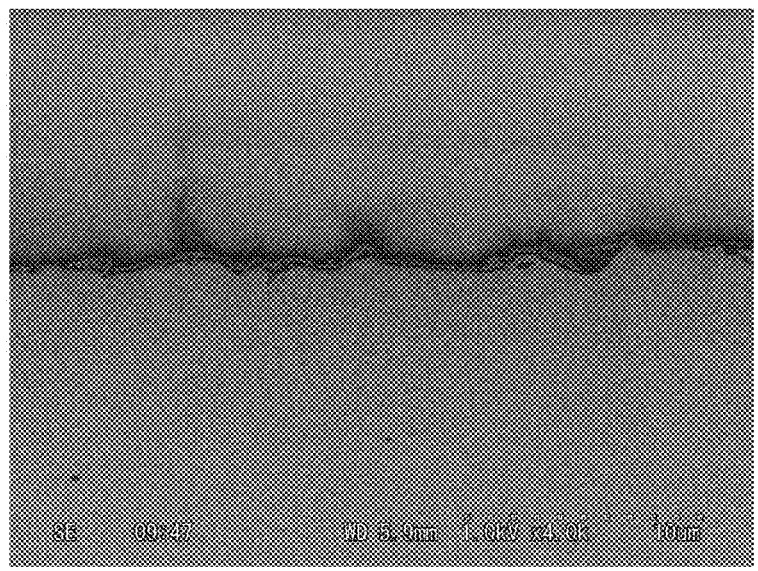
FIG. 19 is a scanning electron microscopic image of the cross-section of the mold (X-4) used in Examples.

The average inclination angle, mean spacing between uneven protrusions, mean spacing between local mountain tops, and surface roughness of the mold (X-4) are shown in Table 1. A scanning electron microscopic image of the cross-section of the mold (X-4) with completed cross-section processing is shown in FIG. 19.

The mold (X-4) was treated with a releasing agent in the same manner as the mold (X-1) to obtain the mold (X-4) treated with a releasing agent. The total reflectance of the mold (X-4) is shown in Table 1.

TABLE 1

| Mold | θa (degrees) | Sm (nm) | S (nm) | Ra (nm) | Ry (nm) | Rz (nm) | RMS (nm) | Total reflectance Rt (%) Light source C |
|---|---|---|---|---|---|---|---|---|
| X-1 | 60.4 | 789.7 | 476.3 | 78.0 | 798.4 | 722.5 | 97.7 | 2.6 |
| X-2 | 55.0 | 2170.3 | 1477.3 | 455.6 | 4556.3 | 2569.3 | 589.6 | 9.2 |
| X-3 | 47.1 | 1068.5 | 673.9 | 122.5 | 1207.2 | 1100.2 | 154.0 | 3.3 |
| X-4 | 4.2 | 3144.3 | 2654.7 | 148.6 | 1997.9 | 1409.0 | 199.0 | 32.8 |

(Active Energy Ray Curable Resin Composition (A-1))

50 parts by weight of 1,6-hexanediol diacrylate (hereinbelow, described as C6DA), 50 parts by weight of a condensate of trimethylol ethane/acrylic acid/succinic acid (2/4/1) (hereinbelow, described as TAS), and 3 parts by weight of benzoyl ethyl ether (hereinbelow, described as BEE), were mixed and stirred until BEE is dissolved to prepare the active energy ray curable resin composition (A-1).

(Active Energy Ray Curable Resin Composition (A-2))

50 parts by weight of polybutylene glycol dimethacrylate (acryl ester PBOM, manufactured by Mitsubishi Rayon Co., Ltd.) (hereinbelow, described as PBOM), 50 parts by weight of TAS, and 3 parts by weight of BEE were mixed and stirred until BEE is dissolved to prepare the active energy ray curable resin composition (A-2).

(Active Energy Ray Curable Resin Composition (A-3))

80 parts by weight of PBOM, 20 parts by weight of TAS, and 3 parts by weight of BEE were mixed and stirred until BEE is dissolved to prepare the active energy ray curable resin composition (A-3).

(Active Energy Ray Curable Resin Composition (A-4))

100 parts by weight of PBOM, and 3 parts by weight of BEE were mixed and stirred until BEE is dissolved to prepare the active energy ray curable resin composition (A-4).

(Active Energy Ray Curable Resin Composition (A-5))

50 parts by weight of C6DA, 50 parts by weight of PBOM, and 3 parts by weight of IRGACURE 184 (manufactured by Ciba Specialty Chemicals Co., Ltd.)

were mixed and stirred until IRGACURE 184 is dissolved to prepare the active energy ray curable resin composition (A-5).

(High Refractive Index Material Liquid (B-1))

100 parts by weight of OGSOL EA-0200 (manufactured by Osaka Gas Chemicals Co., Ltd.), 3 parts by weight of benzoyl ethyl ether, and 20 parts by weight of toluene were mixed to prepare the high refractive index material liquid (B-1).

(High Refractive Index Material Liquid (B-2))
100 parts by weight of OGSOL EA-0280 (manufactured by Osaka Gas Chemicals Co., Ltd., 50% methyl ethyl ketone), and
1 part by weight of benzoyl ethyl ether
were mixed to prepare the high refractive index material liquid (B-2).

(Active Energy Ray Curable Resin for Optical Sheet)

It was manufactured according to the method described in [Manufacturing example] of JP 2012-003074 A (Japanese Patent Application No. 2010-138529).

To a glass flask, 117.6 g (0.7 mol) of hexamethylene diisocyanate, 151.2 g (0.3 mol) of isocyanurate type hexamethylene diisocyanate trimer, 128.7 g (0.99 mol) of 2-hydroxypropyl acrylate, 693 g (1.54 mol) of pentaerythritol triacrylate, 100 ppm of dilaurylic acid di-n-butyl tin, and 0.55 g of hydroquinone monomethyl ether were added, and the reaction was allowed to occur under the condition of 70 to 80° C. until the residual isocyanate concentration is 0.1% or lower, and thus an urethane acrylate compound was obtained.

35 parts by weight of the urethane acrylate compound, 25 parts by weight of PBOM, 40 parts by weight of New Frontier BPEM-10 (manufactured by Dai-ichi Kogyo Seiyaku Co., Ltd.), and 1.2 parts by weight of 1-hydroxycylcohexyl phenyl ketone (IRGACURE 184 manufactured by Ciba Specialty Chemicals Co., Ltd.) were mixed with one another to obtain an active energy ray curable resin composition.

(Microlens Array Sheet)

This sheet was prepared by a method described in Example 3 of JP 2012-003074 A (Japanese Patent Application No. 2010-138529).

A mold member having a microlens shape was prepared by an etching method described in WO 2008/069324 A. The mold member that was obtained had a shape in which hemispherical concave portions were arranged.

An active energy ray curable resin composition was uniformly applied to a surface of the mold member, and the composition was covered with a polyethylene terephthalate (hereinafter, referred to as "PET") film (cosmoshine A4300, manufactured by Toyobo Co., Ltd.) having a thickness of 188 μm, and then the active energy ray curable resin composition was uniformly spread using a hand roll. Irradiation of ultraviolet rays (integrated amount of light: 1,000 mJ/cm$^2$) was performed from an upper side of the PET film to cure the active energy ray curable resin composition that was spread between the mold member and the PET film. The PET film and a cured material were peeled off from the mold member, whereby a microlens sheet having a shape, which was inverted from a convex shape of the mold member, on a surface of the PET film was obtained. As a result of the observation using SEM, it was confirmed that hemispherical convex portions having a diameter of 50 μm were regularly arranged.

(Trapezoidal Tent Sheet)

This sheet was prepared by a method described in Example 1 of JP 2012-003074 A (Japanese Patent Application No. 2010-138529).

A mold member was prepared by forming a 500 μm-thick electroless nickel plating layer on a 10 mm-thick stainless alloy as a basic material of a mold member and cutting the electroless nickel plating layer using a diamond bite with an equilateral triangle shape having a vertical angle of 100°. The obtained mold member has a shape in which a pyramid is deformed into a tent-like form with arranged convex portions. The active energy ray curable resin composition prepared in the Production example 1 was uniformly applied to a surface of the mold member, and the composition was covered with the PET film (cosmoshine A4300, manufactured by Toyobo Co., Ltd.) having a thickness of 188 μm, and then the active energy ray curable resin composition was uniformly spread using a hand roll. After that, irradiation of ultraviolet rays was performed from an upper side of the PET film to cure the active energy ray curable resin composition that was spread between the mold member and the PET film. The PET film was peeled off from the mold member, whereby a trapezoidal tent sheet having a shape in which the convex portions of the mold member are inversely transferred on the surface of a PET film was obtained. As a result of the observation using SEM, it was confirmed that a tent-like form of concave type (uneven unit shape), in which the long side is 66 μm, the short side is 33 μm, the depth is about 14 μm, and the bottom angle is 40 degrees, is regularly arranged without any gap.

Example 1

On a surface of the mold (X-1) which has been treated with a releasing agent, the active energy ray curable resin composition (A-1) was added dropwise and covered with the PET film (HK-31, manufactured by Higashiyama Film Co., Ltd.). The active energy ray curable resin composition (A-1) was uniformly spread using a hand roll. Irradiation of ultraviolet rays (integrated amount of light: 1,000 mJ/cm$^2$) was performed from an upper side of the PET film to cure the active energy ray curable resin composition (A-1). The PET film and uneven resin were peeled off from the mold (X-1), whereby the optical article (a-1) having an uneven surface structure as shown in FIG. 2 was obtained. Part of the uneven resin layer remained on the mold (X-1), and the transfer occurred not on the entire surface. A Martens hardness of the uneven resin layer on the optical article (a-1) having an uneven surface structure was measured. The results are shown in Table 2.

Example 2

The optical article (a-2) having an uneven surface structure as shown in FIG. 2 was obtained in the same manner as Example 1 except that the active energy ray curable resin composition (A-2) was used instead of the active energy ray curable resin composition (A-1). Part of the uneven resin layer remained on the mold (X-1), and the transfer occurred not on the entire surface. A Martens hardness of the uneven resin layer on the optical article (a-2) having an uneven surface structure was measured. The results are shown in Table 2.

Example 3

The optical article (a-3) having an uneven surface structure as shown in FIG. 2 was obtained in the same manner as Example 1 except that the active energy ray curable resin composition (A-3) was used instead of the active energy ray curable resin composition (A-1). The uneven resin layer did not remain on the mold (X-1), and the transfer occurred on the entire surface. A Martens hardness of the uneven resin layer on the optical article (a-3) having an uneven surface structure was measured. The results are shown in Table 2.

Example 4

Figure 20:
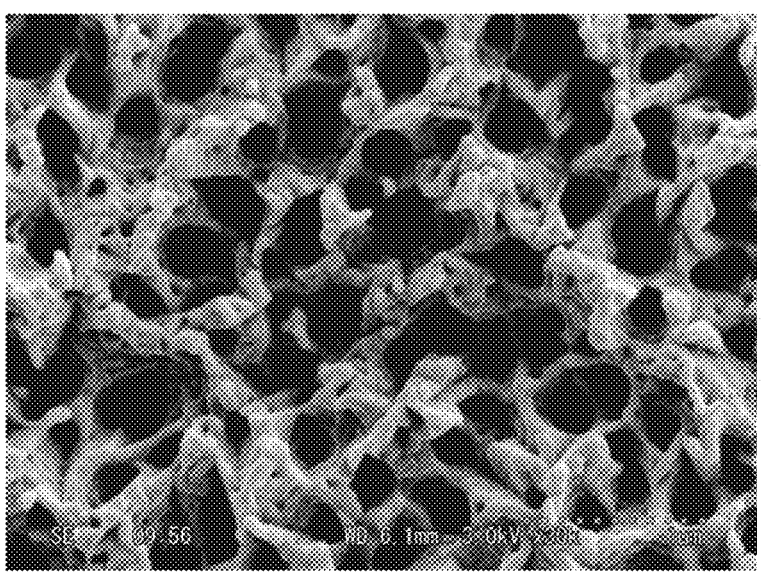
FIG. 20 is a scanning electron microscopic image of the surface of the uneven resin layer of Example 4.
Figure 21:
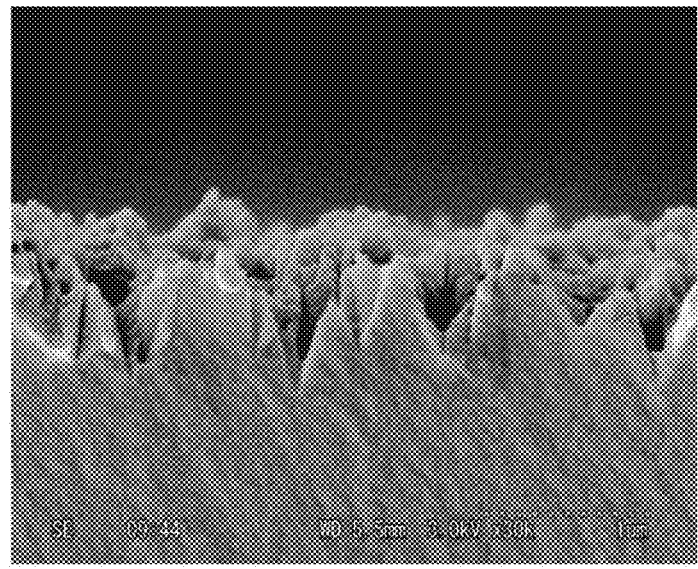
FIG. 21 is a scanning electron microscopic image of the cross-section of the uneven resin layer of Example 4.

The optical article (a-4) having an uneven surface structure as shown in FIG. 2 was obtained in the same manner as Example 1 except that the active energy ray curable resin composition (A-4) was used instead of the active energy ray curable resin composition (A-1). The uneven resin layer did not remain on the mold (X-1), and the transfer occurred on the entire surface. A Martens hardness and surface roughness of the uneven resin layer on the optical article (a-4) having an uneven surface structure were measured. The results are shown in Table 2. The scanning electron microscopic image of the surface of the uneven resin layer is shown in FIG. 20. The scanning electron microscopic image of the cross-section of the uneven resin layer is shown in FIG. 21.

Example 5

The optical article (a-4) having an uneven surface structure obtained in Example 4 was treated with a releasing agent in the same manner as the mold (X-1) to obtain replica mold (Y-1) treated with a releasing agent.

Figure 22:
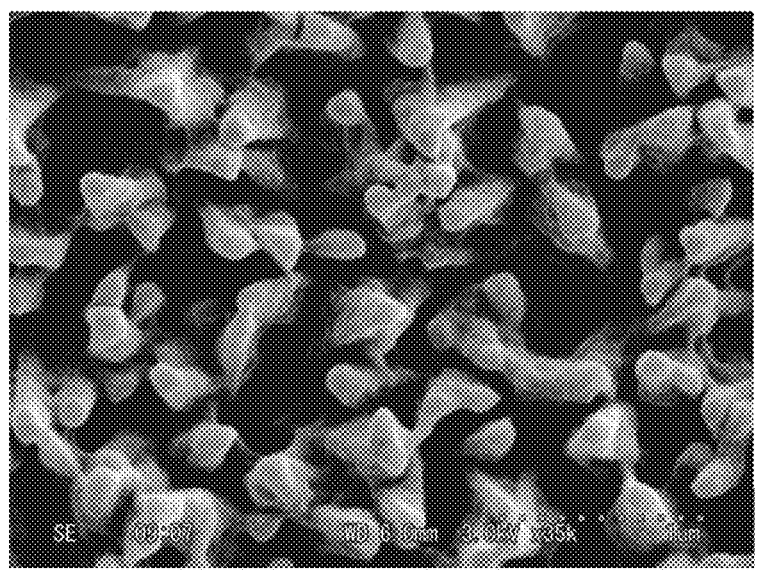
FIG. 22 is a scanning electron microscopic image of the surface of the uneven resin layer of Example 5.
Figure 23:
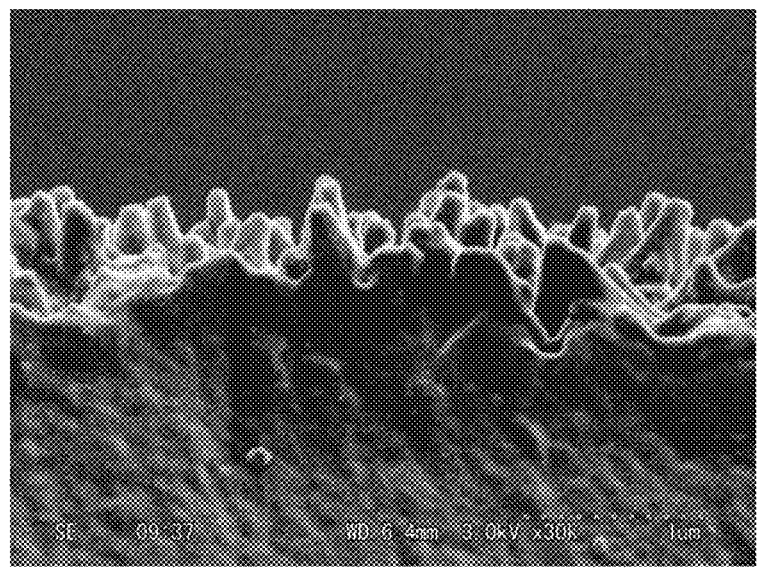
FIG. 23 is a scanning electron microscopic image of the cross-section of the uneven resin layer of Example 5.

On a surface of a glass plate (EAGLE XG manufactured by Corning Incorporated, 5 cm×5 cm, thickness 0.7 mm), the active energy ray curable resin composition (A-4) was added dropwise and covered with the replica mold (Y-1). The active energy ray curable resin composition (A-1) was uniformly spread using a hand roll. Irradiation of ultraviolet rays (integrated amount of light: 1,000 mJ/cm$^2$) was performed from an upper side of the replica mold to cure the active energy ray curable resin composition (A-4). The replica mold (Y-1) was peeled off from the glass and the uneven resin layer, whereby the optical article (y-1) having an uneven surface structure as shown in FIG. 3 was obtained. The uneven resin layer did not remain on the mold (Y-1), and the transfer occurred on the entire surface. Surface roughness of the uneven resin layer on the optical article (y-1) having an uneven surface structure was measured. The results are shown in Table 2. The scanning electron microscopic image of the surface of the uneven resin layer is shown in FIG. 22. The scanning electron microscopic image of the cross-section of the uneven resin layer is shown in FIG. 23.

Example 6

Figure 32:
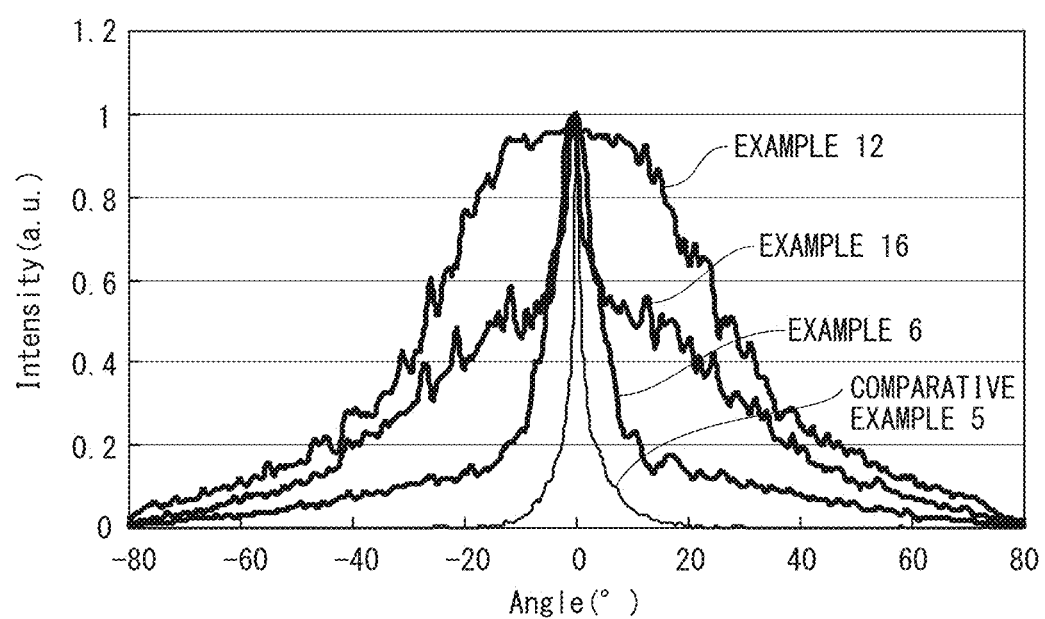
FIG. 32 is a graph illustrating the distribution of intensity of transmitted diffusion light.

The optical article (y-2) having an uneven surface structure as shown in FIG. 3 was obtained in the same manner as Example 5 except that the active energy ray curable resin composition (A-1) was used instead of the active energy ray curable resin composition (A-4). The uneven resin layer did not remain on the mold (Y-1), and the transfer occurred on the entire surface. Average inclination angle, mean spacing between uneven protrusions, mean spacing between local mountain tops, and a diffusion factor of the optical article (y-2) having an uneven surface structure are described in Table 5. Distribution of intensity $I_\theta$ of transmitted diffusion light is shown in FIG. 32. The optical article (y-2) having an uneven surface structure has a higher average inclination angle and diffusion factor compared to Comparative Example 4, and thus it is found that the light diffusion effect by uneven structure is high.

TABLE 2

| Example | Mold/replica mold | Active energy ray curable resin composition | | | Uneven resin layer | | | | | |
| | | TAS [parts by weight] | C6DA [parts by weight] | PBOM [parts by weight] | Martens hardness | Ra [nm] | Ry [nm] | Rz [nm] | RMS [nm] | Transfer characteristics |
|---|---|---|---|---|---|---|---|---|---|---|
| 1 | X-1 | 50 | 50 | — | 143 | — | — | — | — | Δ |
| 2 | X-1 | 50 | — | 50 | 66 | — | — | — | — | Δ |
| 3 | X-1 | 20 | — | 80 | 18 | — | — | — | — | ◯ |
| 4 | X-1 | — | — | 100 | 11 | 83.4 | 781.9 | 677.1 | 103.4 | ◯ |
| 5 | Y-1 | — | — | 100 | — | 74.6 | 794.1 | 675.8 | 93.5 | ◯ |
| 6 | Y-1 | 50 | 50 | — | — | — | — | — | — | ◯ |

Example 7

Matching oil having a refractive index of 1.5 was applied onto a light emitting surface side of an organic EL lighting device (Lumiblade Engineering Kit, manufactured by Philips Corporation; 30.5 mm×38 mm), and the optical article (a-4) having an uneven surface structure, which has been obtained from Example 4, was optically adhered such that the PET film side is in contact with the matching oil. The organic EL lighting device added with the optical article (a-4) having an uneven surface structure was attached to a sample opening portion of an integrating sphere (manufactured by Labsphere, Inc., 8 inches) across a pin-hole having a diameter of 10 mm. A luminous flux having a diameter of 1 mmϕ when allowing a current of 23.2 mA to the organic EL lighting device was measured using a spectroscope (PMA-12, manufactured by Hamamatsu Photonics K.K.). Compared to the luminous flux of Comparative Example 1 (100%) the luminous flux of Example 7 was 144%, indicating an improvement in light extraction efficiency.

Comparative Example 1

The luminous flux was measured in the same manner as Example 7 except that the organic EL lighting device is not attached with the optical article (a-4) having an uneven surface structure.

Example 8

The optical article (y-2) having an uneven surface structure obtained from Example 6 was cut to have a size of 25 mm×25 mm, and the surface of the article was spin-coated (500 rpm) with the high refractive index material liquid (B-1). Under a nitrogen atmosphere (oxygen concentration: 1.0% or less), irradiation of ultraviolet rays (integrated amount of light: 1,000 mJ/cm$^2$) was performed to form a high refractive index layer with thickness of 1 μm or so on a surface of the uneven resin layer, and thus the transparent substrate for a surface light emitter shown in FIG. 6 was obtained.

The transparent substrate for a surface light emitter was set in a chamber of a sputtering apparatus, and ITO was deposited on a surface of the high refractive index layer through a mask having a line-pattern hole to form a transparent electrode having a thickness of 200 nm.

After UV ozone treatment, the transparent substrate for a surface light emitter, in which the transparent electrode was formed, was set in a chamber of a vacuum deposition apparatus. Under conditions of a pressure inside an organic deposition chamber of $10^{-4}$ Pa and a deposition rate of 0.5 to 2.0 nm/second, CuPc (20 nm) of the hole injection layer, TPD (40 nm) of the hole transport layer, CBP: Ir(ppy)$_3$ (20 nm) of the light emitting layer, BCP (10 nm) of the hole blocking layer, and Alq$_3$ (30 nm) of the electron transport layer were sequentially deposited on the transparent electrode. Then, a light emitting layer and other functional layer were selectively formed on the transparent electrode.

Furthermore, under a condition of a deposition rate of 0.059 nm/second, lithium fluoride (0.5 nm) of the electron injection layer under conditions of the pressure inside a metal deposition chamber of $10^{-4}$ Pa and a deposition rate of 0.25 nm/second, and aluminum (100 nm) of a rear surface electrode under a condition of a deposition rate of 0.5 to 4.0 nm/second were sequentially deposited, whereby a light emitting part with a size of 2 mm×2 mm was formed.

Dig-in glass with a size of 20 mm×25 mm was used, and sealing was performed using an epoxy-based sealant (manufactured by Nagase ChemteX Corporation) in such a manner that the light emitting part of a size of 2 mm×2 mm is placed within the dig-in glass, whereby the organic EL device (E-1) was obtained.

The organic EL device (E-1) was attached to a sample opening portion of an integrating sphere (manufactured by Labsphere, Inc., 8 inches) across a pin-hole having a diameter of 10 mm, and then optical characteristics of the organic EL device (E-1) were measured by an LED total luminous flux and efficiency measuring apparatus (C9920-22 system, PMA-12, manufactured by Hamamatsu Photonics K.K.). When a current of 1 mA/cm$^2$ was allowed to flow through the organic EL device (E-1), the current efficiency was 383 cd/m$^2$ at a voltage of 6.9 V, and it is improved by 42% compared to Comparative Example 2.

Example 9

On the light emitting surface side of the organic EL device (E-1) of Example 8, matching oil having refractive index of 1.5 was added dropwise. After covering with a microlens array sheet, pin-holes having a diameter of 10 mm were arranged on top of it and optical characteristics of the organic EL device (E-1) were measured. When a current of 1 mA/cm$^2$ was allowed to flow through the organic EL device (E-1), the current efficiency was 510 cd/m$^2$ at a voltage of 6.9 V, and it is improved by 89% compared to Comparative Example 2.

Example 10

On the light emitting surface side of the organic EL device (E-1) of Example 8, matching oil having refractive index of 1.5 was added dropwise. After covering with a trapezoidal tent sheet, pin-holes having a diameter of 10 mm were arranged on top of it and optical characteristics of the organic EL device (E-1) were measured. When a current of 1 mA/cm$^2$ was allowed to flow through the organic EL device (E-1), the current efficiency was 486 cd/m$^2$ at a voltage of 6.9 V, and it is improved by 80% compared to Comparative Example 2.

Comparative Example 2

The organic EL device (E-2) was obtained in the same manner as Example 8 except a glass plate (25 mm×25 mm) was used instead of the optical article (y-2) having an uneven surface structure. When a current of 1 mA/cm$^2$ was allowed to flow through the organic EL device (E-2), the current efficiency was 270 cd/m$^2$ at a voltage of 6.7 V.

Example 11

Figure 24:
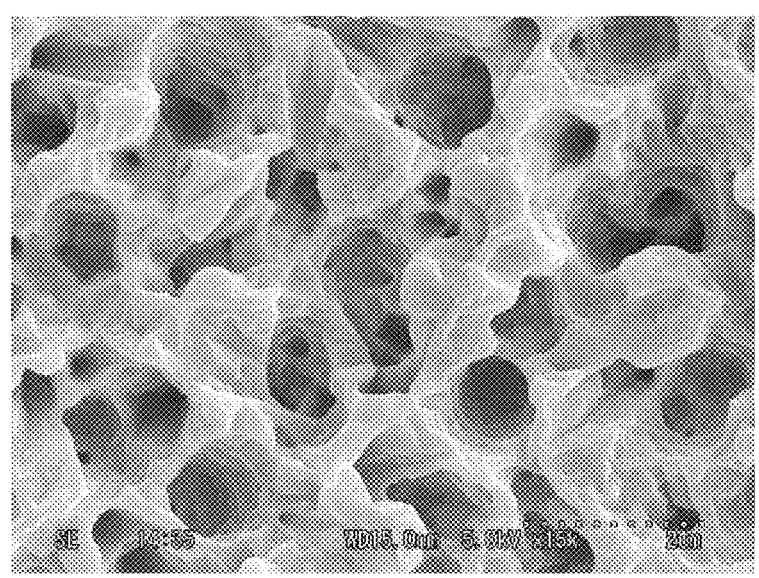
FIG. 24 is a scanning electron microscopic image of the surface of the uneven resin layer of Example 11.
Figure 25:
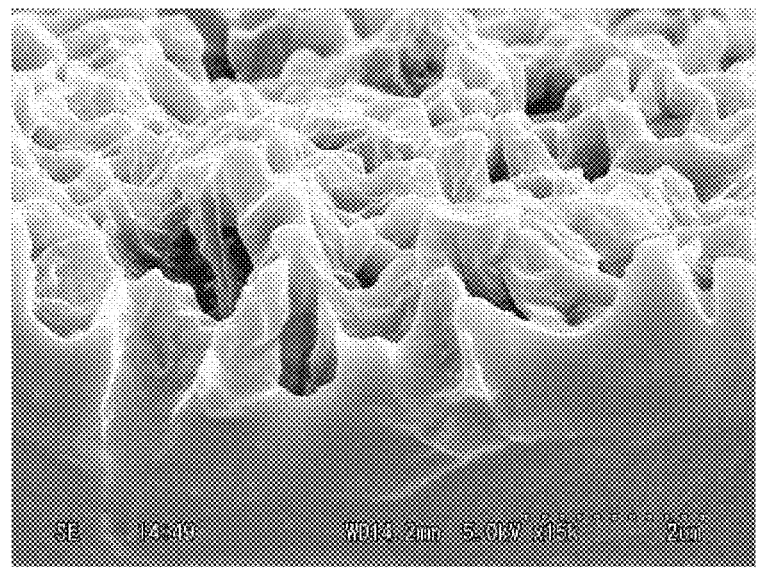
FIG. 25 is a scanning electron microscopic image of the cross-section of the uneven resin layer of Example 11.

The optical article (b-1) having an uneven surface structure as shown in FIG. 2 was obtained in the same manner as Example 1 except that the active energy ray curable resin composition (A-5) was used instead of the active energy ray curable resin composition (A-1) and the mold (X-2) was used instead of the mold (X-1). The uneven resin layer did not remain on the mold (X-2), and the transfer occurred on the entire surface. A Martens hardness and surface roughness of the uneven resin layer of the optical article (b-1) having an uneven surface structure were measured. The results are given in Table 3. The scanning electron microscopic image of the surface of the uneven resin layer is shown in FIG. 24. The scanning electron microscopic image of the cross-section of the uneven resin layer is shown in FIG. 25.

Example 12

The optical article (b-1) having an uneven surface structure obtained in Example 11 was treated with a releasing agent in the same manner as the mold (X-1) to obtain replica mold (Y-2) treated with a releasing agent.

Figure 26:
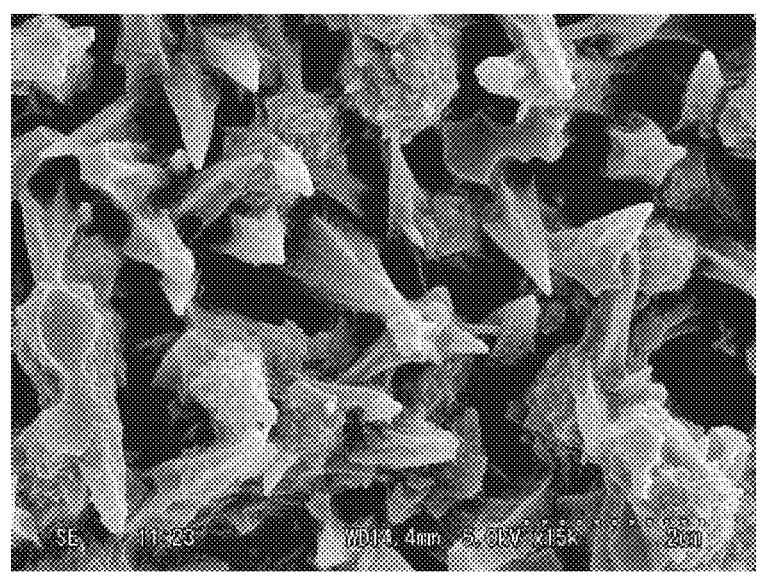
FIG. 26 is a scanning electron microscopic image of the surface of the uneven resin layer of Example 12.
Figure 27:
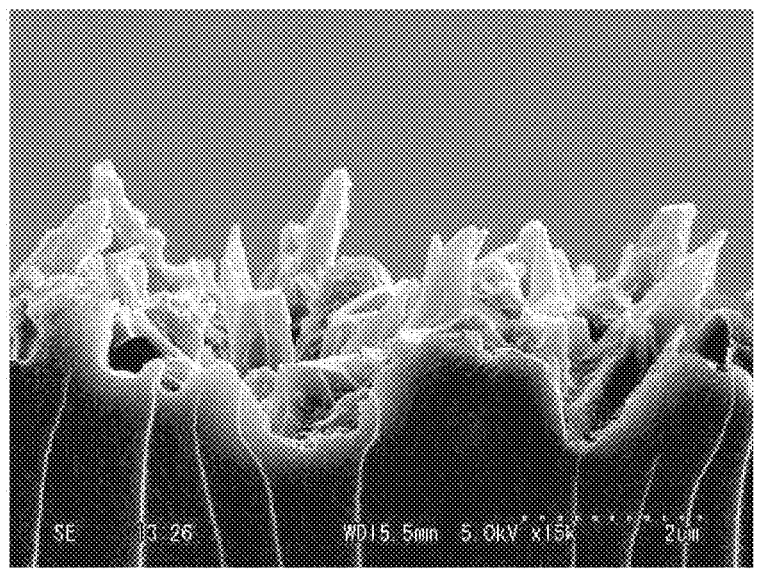
FIG. 27 is a scanning electron microscopic image of the cross-section of the uneven resin layer of Example 12.

The optical article (b-2) having an uneven surface structure as shown in FIG. 3 was obtained in the same manner as Example 6 except that the replica mold (Y-2) was used instead of the replica mold (Y-1). The uneven resin layer did not remain on the mold (Y-2), and the transfer occurred on the entire surface. Surface roughness of the uneven resin layer of the optical article (b-2) having an uneven surface structure was measured. The results are given in Table 3. The scanning electron microscopic image of the surface of the uneven resin layer is shown in FIG. 26. The scanning electron microscopic image of the cross-section of the uneven resin layer is shown in FIG. 27. Average inclination angle, mean spacing between uneven protrusions, mean spacing between local mountain tops, and a diffusion factor of the optical article (b-2) having an uneven surface structure are described in Table 5. Distribution of intensity $I_\theta$ of transmitted diffusion light is shown in FIG. 32. The optical article (b-2) having an uneven surface structure has a higher average inclination angle and diffusion factor compared to Comparative Example 4, and thus it is found that the light diffusion effect by uneven structure is high.

TABLE 3

| | | Active energy ray curable resin composition | | | | Uneven resin layer | | | | |
|---|---|---|---|---|---|---|---|---|---|---|
| | | TAS | C6DA | PBOM | | | | | | |
| Example | Mold/replica mold | [parts by weight] | [parts by weight] | [parts by weight] | Martens hardness | Ra [nm] | Ry [nm] | Rz [nm] | RMS [nm] | Transfer characteristics |
| 11 | X-2 | — | 50 | 50 | 32 | 299.7 | 2798.9 | 1840.6 | 388.4 | ○ |
| 12 | Y-2 | 50 | 50 | — | — | 340.3 | 3654.2 | 2988.1 | 440.3 | ○ |

Example 13

The optical article (b-2) having an uneven surface structure obtained from Example 12 was cut to have a size of 25 mm×25 mm, and the surface of the article was spin-coated (500 rpm) with the high refractive index material liquid (B-2). Under a nitrogen atmosphere (oxygen concentration: 1.0% or less), irradiation of ultraviolet rays (integrated amount of light: 1,000 mJ/cm$^2$) was performed to form a high refractive index layer with thickness of 5 μm or so on a surface of the uneven resin layer, and thus the transparent substrate for a surface light emitter shown in FIG. 6 was obtained.

The organic EL device (E-3) was obtained in the same manner as Example 8 except the resulting transparent substrate for a surface light emitter was used.

Optical characteristics of the organic EL device (E-3) were measured in the same manner as Example 8. When a current of 1 mA/cm$^2$ was allowed to flow through the organic EL device (E-3), the current efficiency was 379 cd/m$^2$ at a voltage of 6.7 V, and it is improved by 40% compared to Comparative Example 2.

Example 14

On the light emitting surface side of the organic EL device (E-3) of Example 12, matching oil with refractive index of 1.5 was added dropwise. After covering with a microlens array sheet, pin-holes having a diameter of 10 mm were arranged on top of it and optical characteristics of the organic EL device (E-3) were measured. When a current of 1 mA/cm$^2$ was allowed to flow through the organic EL device (E-3), the current efficiency was 470 cd/m$^2$ at a voltage of 6.7 V, and it is improved by 74% compared to Comparative Example 2.

Example 15

Figure 28:
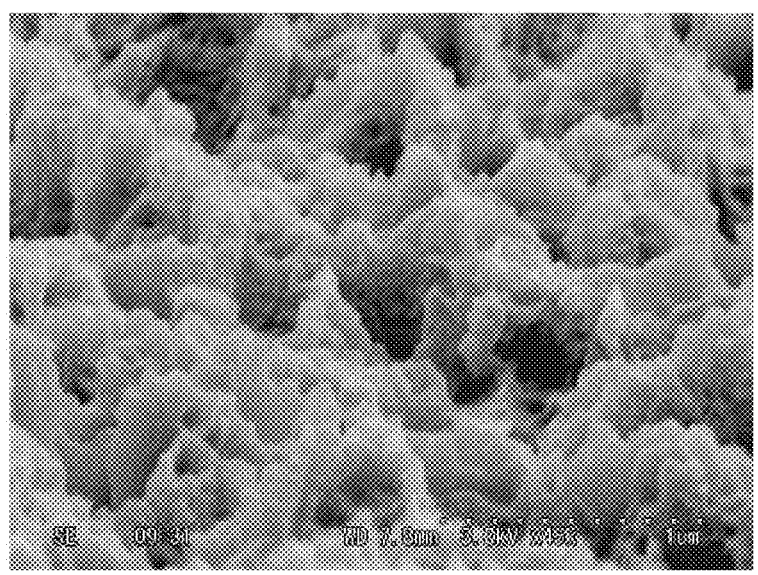
FIG. 28 is a scanning electron microscopic image of the surface of the uneven resin layer of Example 15.

The optical article (c-1) having an uneven surface structure as shown in FIG. 2 was obtained in the same manner as Example 1 except that the active energy ray curable resin composition (A-5) was used instead of the active energy ray curable resin composition (A-1) and the mold (X-3) was used instead of the mold (X-1). The uneven resin layer did not remain on the mold (X-3), and the transfer occurred on the entire surface. Surface roughness of the optical article (c-1) having an uneven surface structure was measured. The results are given in Table 4. The scanning electron microscopic image of the surface of the uneven resin layer is shown in FIG. 28.

Example 16

The optical article (c-1) having an uneven surface structure obtained in Example 15 was treated with a releasing agent in the same manner as the mold (X-1) to obtain replica mold (Y-3) treated with a releasing agent.

Figure 29:
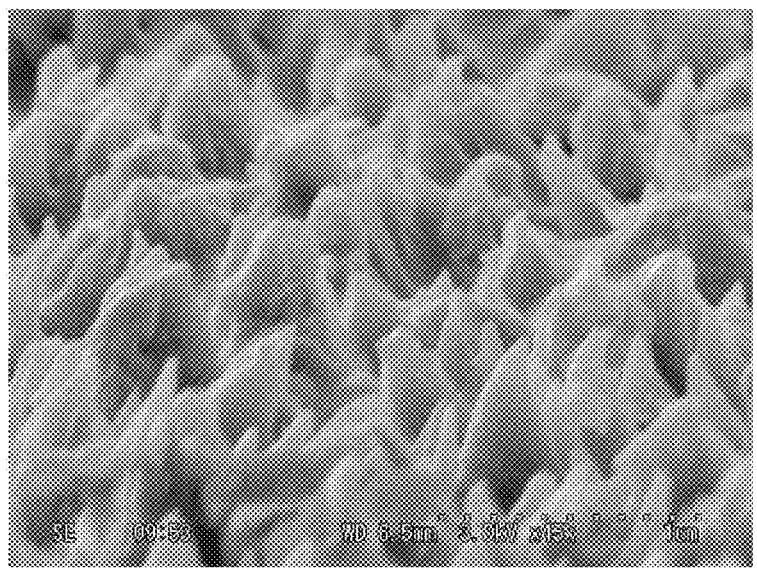
FIG. 29 is a scanning electron microscopic image of the surface of the uneven resin layer of Example 16.
Figure 30:
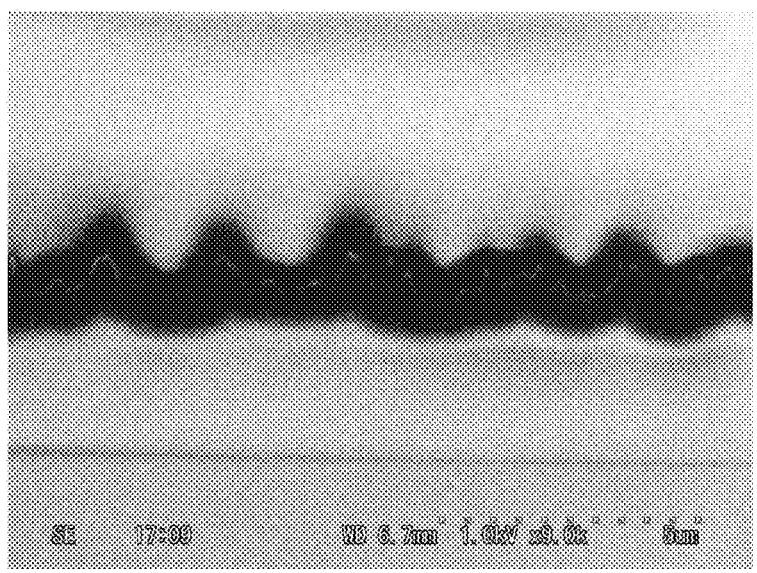
FIG. 30 is a scanning electron microscopic image of the cross-section of the uneven resin layer of Example 16.

The optical article (c-2) having an uneven surface structure as shown in FIG. 3 was obtained in the same manner as Example 6 except that the replica mold (Y-3) was used instead of the replica mold (Y-1). The uneven resin layer did not remain on the mold (Y-3), and the transfer occurred on the entire surface. Surface roughness of the uneven resin layer of the optical article (c-2) having an uneven surface structure was measured. The results are given in Table 4. The scanning electron microscopic image of the surface of the uneven resin layer is shown in FIG. 29. The scanning electron microscopic image of the cross-section of the uneven resin layer with completed cross-section processing is shown in FIG. 30. Average inclination angle, mean spacing between uneven protrusions, mean spacing between local mountain tops, and a diffusion factor of the optical article (c-2) having an uneven surface structure are described in Table 5. Distribution of intensity $I_\theta$ of transmitted diffusion light is shown in FIG. 32. The optical article (c-2) having an uneven surface structure has a higher average inclination angle and diffusion factor compared to Comparative Example 4, and thus it is found that the light diffusion effect by uneven structure is high.

Comparative Example 3

The optical article (d-1) having an uneven surface structure as shown in FIG. 2 was obtained in the same manner as Example 1 except that the active energy ray curable resin composition (A-5) was used instead of the active energy ray curable resin composition (A-1) and the mold (X-4) was used instead of the mold (X-1). The uneven resin layer did not remain on the mold (X-4), and the transfer occurred on the entire surface. Surface roughness of the optical article (d-1) having an uneven surface structure was measured. The results are given in Table 4.

Comparative Example 4

The optical article (d-1) having an uneven surface structure obtained in Comparative Example 3 was treated with a releasing agent in the same manner as the mold (X-1) to obtain replica mold (Y-4) treated with a releasing agent.

Figure 31:
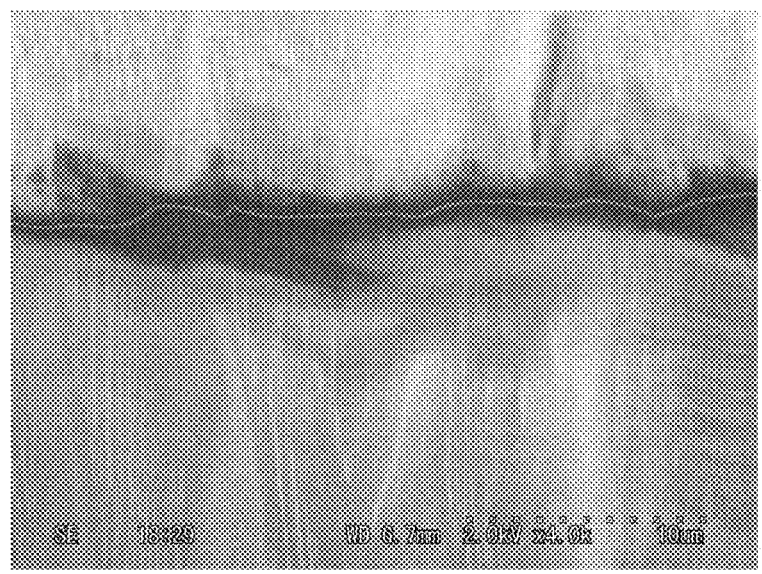
FIG. 31 is a scanning electron microscopic image of the cross-section of the uneven resin layer of Comparative Example 4.

The optical article (d-2) having an uneven surface structure as shown in FIG. 3 was obtained in the same manner as Example 6 except that the replica mold (Y-4) was used instead of the replica mold (Y-1). The uneven resin layer did not remain on the mold (Y-4), and the transfer occurred on the entire surface. Surface roughness of the uneven resin layer of the optical article (d-2) having an uneven surface structure was measured. The results are given in Table 4. The scanning electron microscopic image of the cross-section of the uneven resin layer with completed cross-section processing is shown in FIG. 31. Average inclination angle, mean spacing between uneven protrusions, mean spacing between local mountain tops, and a diffusion factor of the optical article (d-2) having an uneven surface structure are described in Table 5. Distribution of intensity $I_\theta$ of transmitted diffusion light is shown in FIG. 32.

TABLE 4

| | | Active energy ray curable resin composition | | | Uneven resin layer | | | | |
|---|---|---|---|---|---|---|---|---|---|
| | | TAS | C6DA | PBOM | | | | | |
| | Mold/replica mold | [parts by weight] | [parts by weight] | [parts by weight] | Ra [nm] | Ry [nm] | Rz [nm] | RMS [nm] | Transfer characteristics |
| Example 15 | X-3 | — | 50 | 50 | 85.9 | 753.3 | 683.7 | 105.9 | ○ |
| Example 16 | Y-3 | 50 | 50 | — | 120.7 | 1335.7 | 1129.5 | 152.2 | ○ |
| Comparative Example 3 | X-4 | — | 50 | 50 | 166.5 | 2881.8 | 1889.9 | 231.6 | ○ |
| Comparative Example 4 | Y-4 | 50 | 50 | — | 139.2 | 1949.5 | 1272.9 | 183.7 | ○ |

TABLE 5

| | Optical article | θa (degrees) | Sm (nm) | S (nm) | D (%) |
|---|---|---|---|---|---|
| Example 6 | y-2 | 45.5 | 1045.4 | 674.4 | 18.7 |
| Example 12 | b-2 | 40.6 | 2369 | 1784.4 | 52.9 |
| Example 16 | c-2 | 46.1 | 1134.7 | 647.1 | 46.9 |
| Comparative Example 4 | d-2 | 2.7 | 2956.4 | 2519 | 1.2 |

TABLE 6

| | Optical article | Δx | Δy |
|---|---|---|---|
| Comparative Example 5 | glass | 0.072 | 0.053 |
| Example 17 | c-2 | 0.032 | 0.021 |
| Comparative Example 6 | d-2 | 0.040 | 0.032 |

Comparative Example 5

On the light emitting surface side of the organic EL device (E-2), matching oil with refractive index of 1.5 was added dropwise. After covering with a hemispherical lens (material: BK-7, a hemisphere of diameter of 25 mmϕ was processed to have a thickness cut of 0.7 mm from the center), the orientation distribution measurement was performed. The results are given in Table 6.

Example 17

The organic EL device (E-4) was obtained in the same manner as Example 8 except that the optical article (c-2) was used instead the optical article (b-2).

The orientation distribution measurement was performed in the same manner as Comparative Example 5 except that the organic EL device (E-4) was used instead the organic EL device (E-2). The results are given in Table 6. It is found that an angle-dependent variation in hue of emitted light is smaller compared to Comparative Example 5.

Comparative Example 6

The organic EL device (E-5) was obtained in the same manner as Example 8 except that the optical article (d-2) was used instead the optical article (b-2).

The orientation distribution measurement was performed in the same manner as Comparative Example 5 except that the organic EL device (E-5) was used instead the organic EL device (E-2). The results are given in Table 6. It is found that an angle-dependent variation in hue of emitted light is smaller compared to Comparative Example 5, but the variation in hue is greater compared to Example 17.

INDUSTRIAL APPLICABILITY

The optical article having an uneven surface structure of the invention is useful as an optical film for performing light diffraction or diffusion, a transparent substrate for a surface light emitter, a light extraction member of a surface light emitter, a protective plate for a transparent substrate solar cell, a transparent substrate for a thin film solar cell, a replica mold, or the like. The surface light emitter of the invention is useful as an organic EL lighting device, an organic EL display, or the like.

REFERENCE SIGNS LIST

10 Mold
12 Protrusions
14 Plating film
16 Mold substrate
20 Substrate for optical article
20a Substrate for replica mold
20b Transparent substrate
30 First optical article
30a Replica mold
32 Active energy ray curable resin composition
34 Uneven resin layer
36 Recession part
40 Substrate for optical article
40b Transparent substrate
50 Second optical article
52 Active energy ray curable resin composition
54 Uneven resin layer
56 Protrusions
60 Transparent substrate for a surface light emitter
62 Light extraction part
64 High refractive index layer
66 Adhesive layer
68 Other transparent substrate
70 Organic EL device (surface light emitter)
80 Light emission part
82 Transparent electrode
84 Organic semiconductor layer
86 Rear surface electrode

The invention claimed is:

1. A method for manufacturing an optical article having an uneven surface structure comprising:
   placing an active energy ray curable resin composition between a mold having an uneven surface structure, wherein an average inclination angle obtained is from 20 to 80 degrees, and a diffusion factor obtained is 5 to 80%, or a replica mold having the uneven structure of the mold transferred on a surface of a replica mold substrate, and a substrate for an optical article;
   forming, on a surface of the substrate for an optical article, an uneven resin layer transferred with the uneven structure of the mold or the replica mold by irradiating the active energy ray curable resin composition with active energy ray to cure the active energy ray curable resin composition; and
   releasing the optical article having the uneven resin layer and the substrate for an optical article from the mold or the replica mold;
   wherein:
   the average inclination angle is defined by:
      collecting a photographic image of an uneven structure for the length L (10 μm), which is a standard length in direction x perpendicular to height direction y of the uneven structure, from a cross-sectional photographic image of a mold taken by a scanning electron microscope,
      digitalizing the collected photographic image of the uneven structure,
      transforming a ridge line of the uneven structure into an xy coordinate,
      obtaining an average inclination angle θa from the obtained coordination data of the ridge line (y=f(x)) by the following equation $$\theta a = \tan^{-1}\left(\frac{1}{L}\int \left|\frac{df(x)}{dx}\right| dx\right),$$

wherein the average inclination angle θa is obtained similarly for 20 spots in total, an average value of which is obtained, and
   wherein the diffusion factor as obtained by the method described below is 5 to 80%:
   in a height direction of an uneven structure, laser light is applied to an optical article; intensity $I_\theta$ of transmitted diffusion light, which is emitted after transmission through an optical article, is measured; from the intensity when exit angle θ is 5 degrees, 20 degrees, and 70 degrees, a diffusion factor D is obtained by the following equation $$D = \frac{(B_{70} + B_{20})/2}{B_5} \times 100$$

$$B_\theta = I_\theta / \cos\theta.$$

2. An optical article having an uneven surface structure which is manufactured by the manufacturing method according to claim 1.

3. The method for manufacturing an optical article having an uneven surface structure according to claim 1, wherein the irregularly uneven surface structure is a plating film of a metal selected from the group consisting of nickel, nickel alloy, copper, and copper alloy.

4. The method for manufacturing an optical article having an uneven surface structure according to claim 1, wherein the active energy ray curable resin composition comprises polybutylene glycol di(meth)acrylate.

5. The method for manufacturing an optical article having an uneven surface structure according to claim 1, wherein the plurality of needle-like protrusions are irregularly formed on the surface of the mold.

6. The method for manufacturing an optical article having an uneven surface structure according to claim 1, wherein the uneven structure comprises a metal.

7. The method for manufacturing an optical article having an uneven surface structure according to claim 6, wherein the metal is nickel, a nickel alloy, copper, or a copper alloy.

8. The method for manufacturing an optical article having an uneven surface structure according to claim 6, wherein the uneven surface structure has a total reflectance of 1 to 30% from a surface on the side having the uneven structure as measured using a light source C according to JIS K 7105.

9. The method for manufacturing an optical article having an uneven surface structure according to claim 1, wherein the metal is nickel, a nickel alloy, copper, or a copper alloy.

10. The method for manufacturing an optical article having an uneven surface structure according to claim 1, wherein the uneven surface structure is constituted with a plurality of needle-like protrusions including a metal.

11. The method for manufacturing an optical article having an uneven surface structure according to claim 10, wherein the metal is nickel, a nickel alloy, copper, or a copper alloy.

* * * * *